United States Patent [19]
Urata et al.

[11] Patent Number: 5,274,218
[45] Date of Patent: Dec. 28, 1993

[54] MAGNETIC RECORDING METHOD AND CIRCUIT FOR TOLL ROAD TICKET

[75] Inventors: Hideo Urata; Naoshi Noguchi; Shigeru Jojo, all of Kobe; Riichiro Yamashita, Takasago; Nobuhide Hirako, Kobe, all of Japan

[73] Assignee: Mitsubishi Jukogyo Kabushiki Kaisha, Tokyo, Japan

[21] Appl. No.: 756,991

[22] Filed: Sep. 9, 1991

[30] Foreign Application Priority Data

Sep. 7, 1990 [JP] Japan .................. 2-235745
Sep. 7, 1990 [JP] Japan .................. 2-235746
Feb. 19, 1991 [JP] Japan .................. 3-24653

[51] Int. Cl.⁵ .................. G06F 15/20; G06F 15/48
[52] U.S. Cl. .................. 235/449; 235/384
[58] Field of Search .................. 235/384, 449; 340/928; 360/28

[56] References Cited

U.S. PATENT DOCUMENTS

| | | | |
|---|---|---|---|
| 4,183,066 | 1/1980 | Anderson | 360/40 |
| 4,288,688 | 9/1981 | Kiyama et al. | 235/384 |
| 4,389,681 | 6/1983 | Tanaka et al. | 360/28 X |
| 4,675,824 | 6/1987 | Kiyama et al. | 340/928 X |
| 4,937,436 | 6/1990 | Eglise et al. | 235/449 X |

FOREIGN PATENT DOCUMENTS

| | | |
|---|---|---|
| 0081653 | 6/1983 | European Pat. Off. |
| 2506543 | 5/1981 | France . |
| 59-66762 | 4/1984 | Japan .................. 235/384 |
| WO87/00323 | 1/1987 | PCT Int'l Appl. . |
| 1522895 | 8/1978 | United Kingdom . |
| 2091637A | 8/1982 | United Kingdom . |
| 2210758 | 6/1989 | United Kingdom . |

OTHER PUBLICATIONS

Patent Abstracts of Japan, vol. 13, No. 458, 1989.

*Primary Examiner*—Constantine Hannaher
*Assistant Examiner*—Edward J. Glick
*Attorney, Agent, or Firm*—Jacobson, Price, Holman & Stern

[57] ABSTRACT

A method for reading information from a toll road ticket in which a mark indicating magnetic recording density is formed on a ticket and is detected. A magnetic record demodulating circuit is selected in accordance with the result of detection. Further, a conversion method for increasing a recording capacity of a ticket is provided.

5 Claims, 23 Drawing Sheets

MAGNETIC READ OUT TIMING CHART

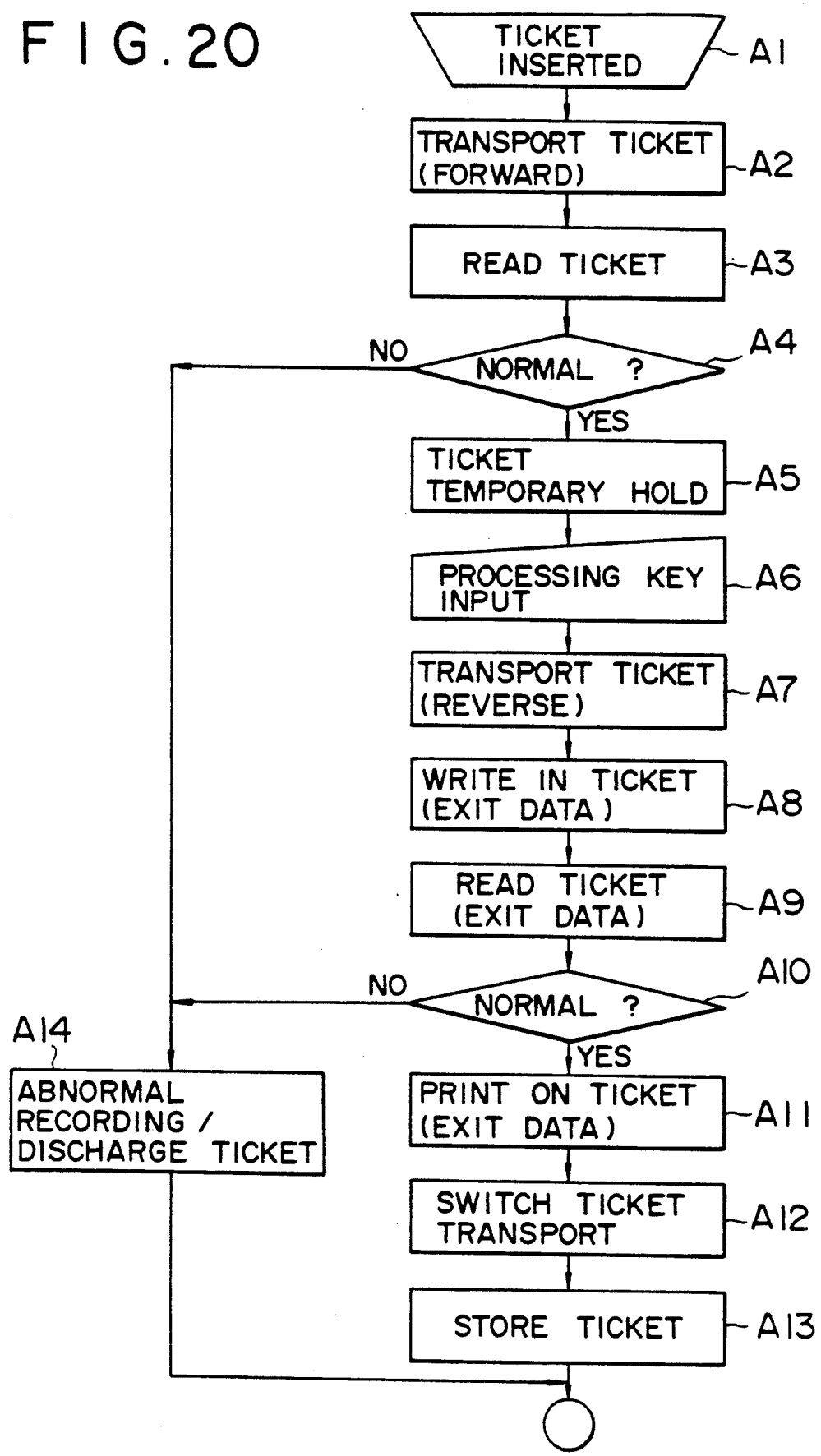

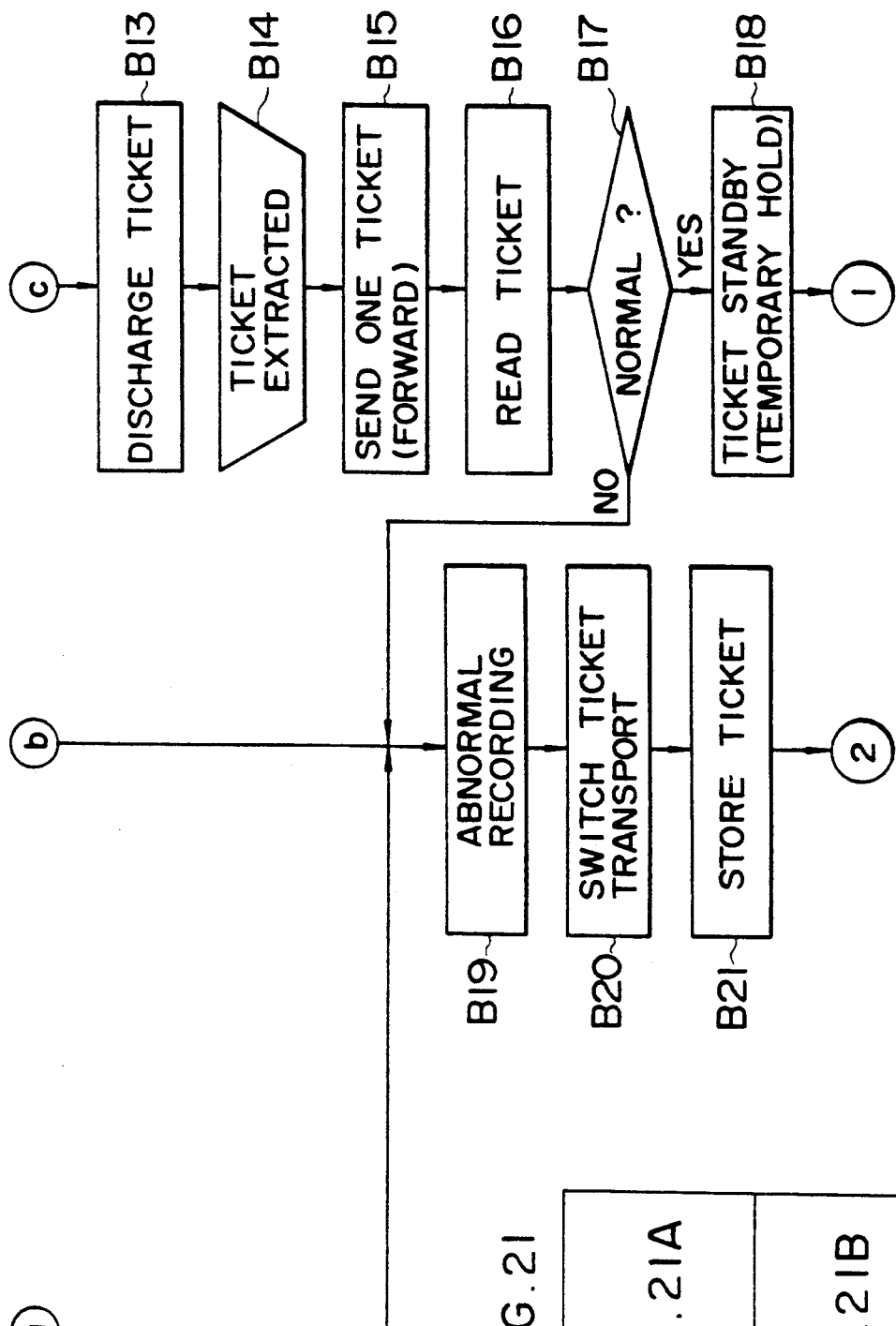

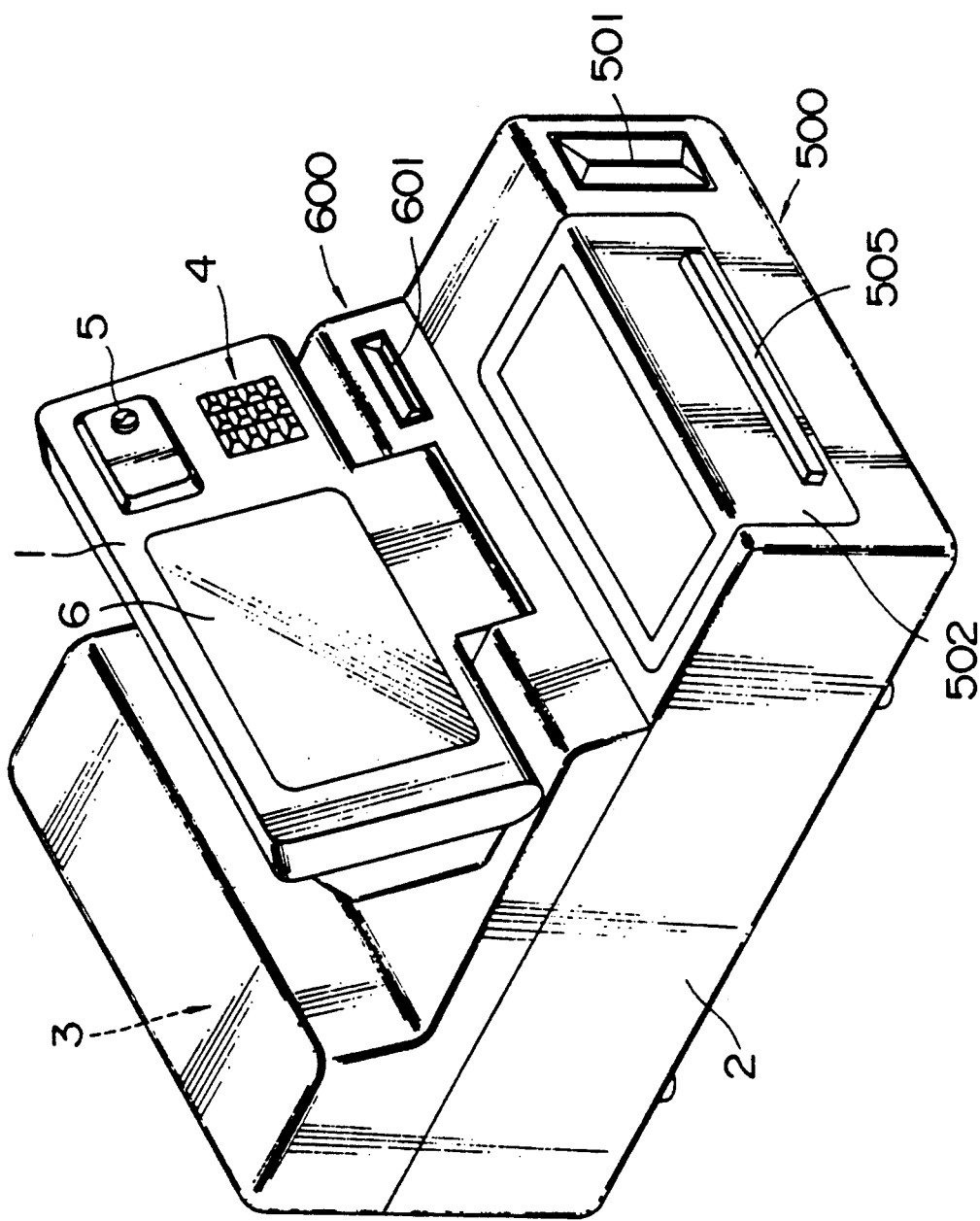

MAGNETIC RECORDING METHOD AND CIRCUIT FOR TOLL ROAD TICKET

BACKGROUND OF THE INVENTION

1. Field of the Invention

The present invention relates to a toll receiving system, and more particularly to a method for accurately reading information from tickets which has been written at different recording densities.

The present invention relates further to a magnetic recording conversion method for increasing the magnetic recording capacity of a magnetic card type ticket in a toll road system having existing magnetic card type terminal equipment and new equipment which is operable at higher densities than existing terminal equipment.

2. Description of the Related Art

In a long-distance toll road which has several entrance gates and several exit gates at a plurality of locations, a toll amount is collected which depends on the distance driven and the type of vehicle. Specifically, a ticket stores entrance gate information including the type of a car, the date and hour of use, and the entrance gate name. This information is recorded magnetically on a toll road ticket which is distributed to a user at the entrance gate of a toll road. An operator at an exit gate takes the ticket from the user and inserts the ticket into an apparatus which reads information recorded magnetically in the ticket so as to collect the appropriate toll amount.

Furthermore, terminal equipment is provided at entrance gates and exit gates for processing tickets or cards, in some systems called a "Highway Card", which is a prepaid card, and a credit card which is sometimes called a "Separately Paid Plate".

FIG. 9 shows an example of a magnetic card type ticket MC. In FIG. 9, MS denotes a magnetic stripe, on which magnetic recording is made on one side track. In most existing terminal equipment, the recording density is 100 bits per inch (BPI), and the recording system is an FM system. Further, in the terminal equipment at the entrance gate, one track is divided into three areas MS1, MS2 and MS3 along the length of the track for backing up recorded contents, so that the same entrance gate information is recorded in each area. In the terminal equipment at the exit gate, after the entrance gate information has been read, the exit gate information is recorded, including the toll, the exit gate name and the date and hour. The exit gate information and entrance gate information is recorded by overwriting in one of several back-up recording areas. The recorded information is also read to confirm whether recording has been made correctly.

Recently, a trend has developed in which the quantity of information recorded at the exit gate has expanded to accommodate toll collection by credit cards. As a result, the storage capacity for 100 BPI in an existing recording system using only one tract will not be able to accommodate storage of information in the new systems.

Thus, it has become necessary to plan for an increase in the recording capacity, but it is not practical to all at once replace the existing terminal equipment with new equipment at all the gates of a certain toll road because the road must be closed, even if temporarily. Accordingly, the existing terminal equipment is to be gradually replaced with new equipment. In this case, however, tickets having different recording density will be used in a toll road system with existing magnetic card type terminal equipment (hereinafter referred to as "existing equipment") and "new terminal equipment". Accordingly, a method which is able to demodulate magnetically recorded information correctly from tickets of different recording densities is required.

Furthermore, in a conventional magnetic card system, a frequency modulation (FM) system is adopted as a coding system for digital magnetic recording.

FIG. 16 shows an example of a record by an FM system. As illustrated in FIG. 16, an FM system forms an FM code array 402 so as to perform magnetization inversion at boundaries 401A of all the bit cells in a data bit array 400 and at centers 401B of bit cells of respective data bits "1". It is possible to obtain synchronization when reading the information among bits with a magnetization inversion signal 404A at the bit cell boundary Consequently, a high self-synchronizing capacity can be achieved. In FIG. 16, reference numeral 403 denotes a regenerative signal, 404 denotes a detection pulse, 405 denotes a detection clock, 406 denotes a decoder input, 407 denotes decoded data, Tb denotes a bit period, and Tw denotes detection window width.

In the FM system, however, the density ratio (DR) of the maximum bit per inch (BPI) to the maximum flux reversals per inch (FRPI) determined by the characteristics of a magnetic card (DR=BPI/FRPI) and a magnetic head is as low as 0.5. Hence, the FM system is not suitable for high-density magnetic recording.

Further, in a conventional magnetic card system, the width of the detection clock 405 at the read time, corresponding to the detection window width (Tw), is fixed for every system. Therefore, only a magnetic card having a fixed magnetic recording density can be read.

SUMMARY OF THE INVENTION

It is a first object of the present invention to provide a method for reading information from a toll road ticket which accommodates different ticket magnetic recording densities.

It is a second object of the present invention to provide a magnetic recording conversion method for a toll road ticket which accommodates different ticket magnetic recording densities.

A toll ticket information reading method according to the present invention features the steps of detecting a magnetic recording density identifying mark formed in a ticket, and selecting an appropriate magnetic record demodulating means in accordance with the detection so as to demodulate the read data.

The difference in magnetic recording density of a ticket is indicated by the existence of a mark or in the difference of the mark. Accordingly, it is possible to demodulate an output signal of the read head from tickets having different magnetic recording densities.

A first method for magnetic recording conversion according to the present invention features the steps of allocating one track's worth of read head and write head for a magnetic stripe of a ticket, reading information of a predetermined bit density which has been previously recorded ("recorded information") with the read head, recording new information with the write head at a bit density higher than that of the recorded information, and reading the recorded contents of the new information with the read head so as to confirm correct recording.

A third method for magnetic recording conversion according to the present invention features recording new information with a bit density higher than that of recorded information in the second conversion method mentioned above.

A fourth method for magnetic record conversion according to the present invention features recording new information by a MFM (modified frequency modulation) system as opposed to recorded information which is recorded by an FM system in the first, the second or the third conversion methods mentioned above.

In the first magnetic record conversion method of the present invention, one track is formed in a magnetic stripe of the ticket as is done with the existing equipment. However, the write bit density is higher than that of existing equipment and the recording capacity is increased by that amount. In this case, even if entrance gate information has been recorded with the existing equipment at the entrance gate at a bit density as low as 100 BPI, it is possible to read the information with a read head at the exit gate.

In the second magnetic record conversion method of the present invention, two or more tracks are formed in the magnetic stripe of the ticket, which is different from that done with the existing equipment. Therefore, even if the write bit density is the same as that of the existing equipment, the recording capacity is increased by the number of additional tracks. Further, in this case, even if the entrance gate information has been recorded in one track with the existing equipment at the entrance gate, it is possible to read the information with any of a plurality of read heads.

In the third magnetic record conversion method of the present invention, the write bit density is higher than that of the existing equipment when new information is recorded in a plurality of tracks by the second conversion method. Thus, the recording density is increased even further.

In the fourth magnetic record conversion method of the present invention, the bit density is doubled to 200 BPI by writing with a modified FM (MFM) system even as the flux changes per inch (FCPI) remains the same as in the case of 100 BPI afforded by the existing FM system. The recording capacity is increased by that amount. As a result, with the FCPI the same, the write head of the existing equipment may be used.

BRIEF DESCRIPTION OF THE DRAWINGS

FIG. 18 to FIG. 20, FIG. 22, and FIG. 23 are for explaining a ticket identifying machine which is a terminal equipment of a toll ticket receiving system in a toll road, in which:

FIG. 18 is a plan view illustrating the mechanism of a ticket processing portion;

FIG. 19 is a sectional view taken along an arrow mark XIX—XIX in FIG. 18;

FIG. 20 is a flow chart showing processing procedures thereof;

FIGS. 21, 21A and 21B are a flow chart showing processing procedures in case of application as a ticket vending machine.

FIG. 22 is a perspective view of the terminal in a toll receiving system; and

FIG. 23 is a schematic diagram of a card processing portion.

DETAILED DESCRIPTION OF THE PREFERRED EMBODIMENT

Embodiments of the present invention will be described with reference to FIG. 1 to FIG. 23.

Figure 1:
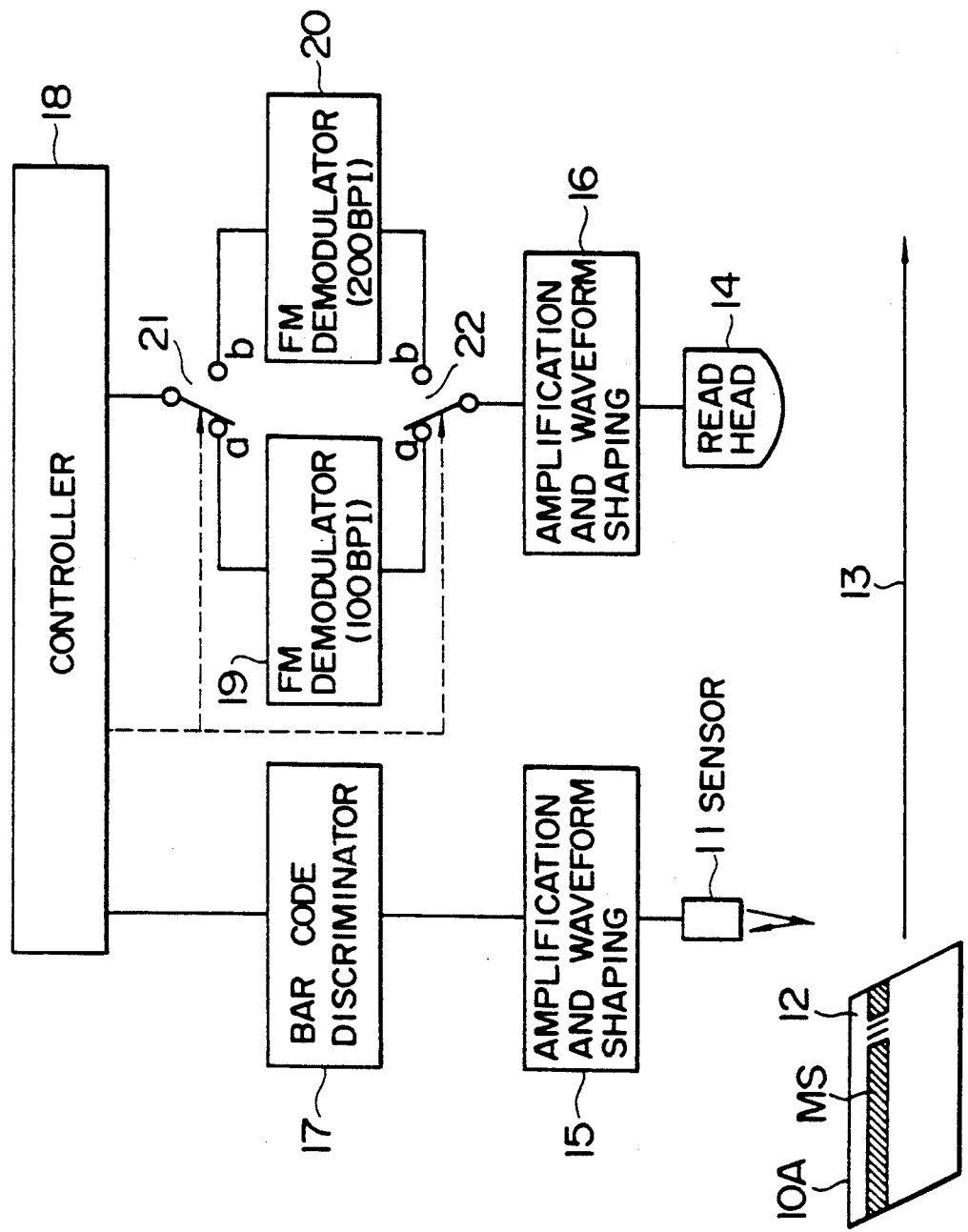
FIG. 1 to FIG. 4 show an embodiment of a magnetic information reading method of the present invention.
Figure 9:
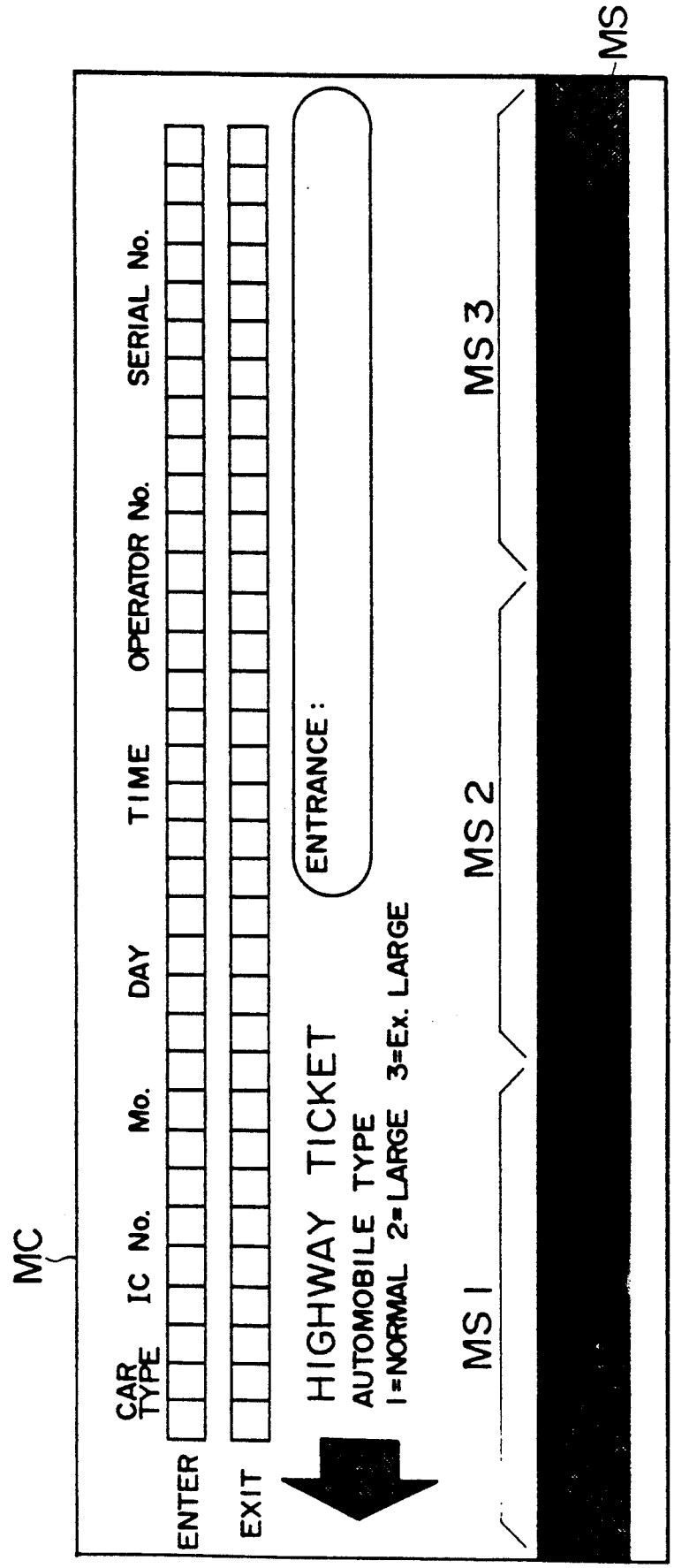
FIG. 9 is a plan view showing an example of the ticket.

FIG. 1 shows a principal part of a terminal equipment featuring structure for detecting a mark on a toll road ticket by a bar code sensor 11, according to a first embodiment of the present invention. In FIG. 1, 10A indicates a new type ticket in which information is recorded with an FM system by means of new equipment at a magnetic recording density as high as 200 BPI, and a bar code 12 is formed as a mark at a tip portion of a card. As compared with the new ticket 10A, an existing ticket MC of 100 BPI has no bar code as shown in FIG. 9. Accordingly, it is possible to distinguish between a new ("new ticket") ticket 10A of 200 BPI and an existing ticket MC of 100 BPI depending on the existence of the bar code 12. The bar code 12 may be either optically readable or magnetically readable.

The bar code sensor 11 and a read head 14 are disposed along a transport passage 13 for a ticket in the terminal equipment, but the sensor 11 is located "upstream" from the read head. Furthermore, in the terminal equipment there are provided two sets of amplification and waveform shaping circuits 15 and 16, a bar discriminator 17, a controller 18, an FM demodulator 19 for 100 BPI demodulation, an FM demodulator 20 for 200 BPI demodulation, and two sets of change-over switches 21 and 22. A transport mechanism and the like will be described later with reference to FIG. 18 to FIG. 23.

The bar code discriminator 17 receives an output signal of the bar code sensor 11 through the amplification and waveform shaping circuit 15, detects the existence of the bar code 12 and supplies the result thereof to the controller 18. If there is no bar code 12 on the ticket, the controller 18 connects the change-over switches 21 and 22 with contact respectively, to select the FM demodulator 19. This FM demodulator 19 receives an output signal of the read head 14 through the amplification and waveform shaping circuit 16 and demodulates the signal, and supplies the demodulated information to the controller 18. On the contrary, when a bar code 12 is selected on the ticket, the controller 18 connects the change-over switches 21 and 22 to contacts b, respectively, thereby to select the FM demodulator 20 which demodulates at 200 BPI. Thus, the FM demodulator 20 receives the output signal of the read head 14 through the amplification and waveform shaping portion 16 and demodulates the signal, and supplies the demodulated information to the controller 18. The controller 18 performs a predetermined processing based on the information of the ticket obtained from the FM demodulator 19 or 20, and records thereafter the processed information in a magnetic stripe MS of the ticket at a high magnetic recording density such as 200 BPI by means of a write head (not shown). The controller confirms whether the information has been written correctly or not by reading it immediately thereafter. At this point, the ticket is transported so as to reciprocate in the terminal equipment. New information is written in a return trip, and the read head 14 is used for confirmation immediately thereafter. Furthermore, the change-over switches 21 and 22 are thrown on the contact b side so as to select the FM demodulator 20 at 200 BPI.

Figure 2:
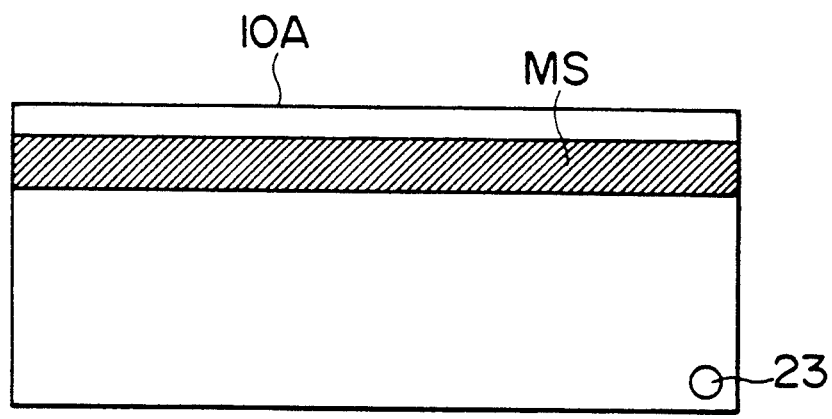
Figure 3:
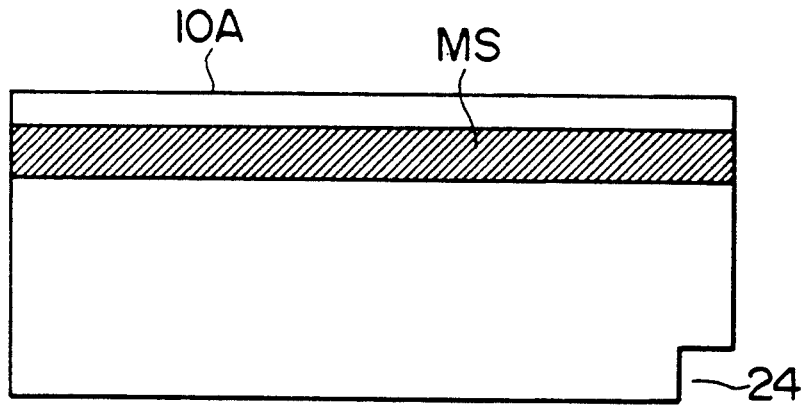

FIG. 2 shows another example of the mark as a second embodiment, in which a hole 23 is formed in the new type ticket 10A. Further, FIG. 3 shows still another example of the mark as a third embodiment, in which a cutout 24 is formed in the new type ticket 10A. By contrast, there is neither a hole nor a cutout in an existing ticket MC of 100 BPI shown in FIG. 9. Accordingly, it is possible to distinguish between the new type ticket 10A (200 BPI) and the existing ticket MC (100 BPI) depending on the existence of the hole 23 or the cutout 24. When the hole 23 or the cutout 24 is used as a mark for discriminating magnetic recording density, the existence of the hole 23 or the cutout 24 may be detected by using a well-known sensor, such as an optical sensor, in place of the bar code sensor 11 and the bar code discriminator 17 may supply result the detection to the controller 18.

Figure 4:
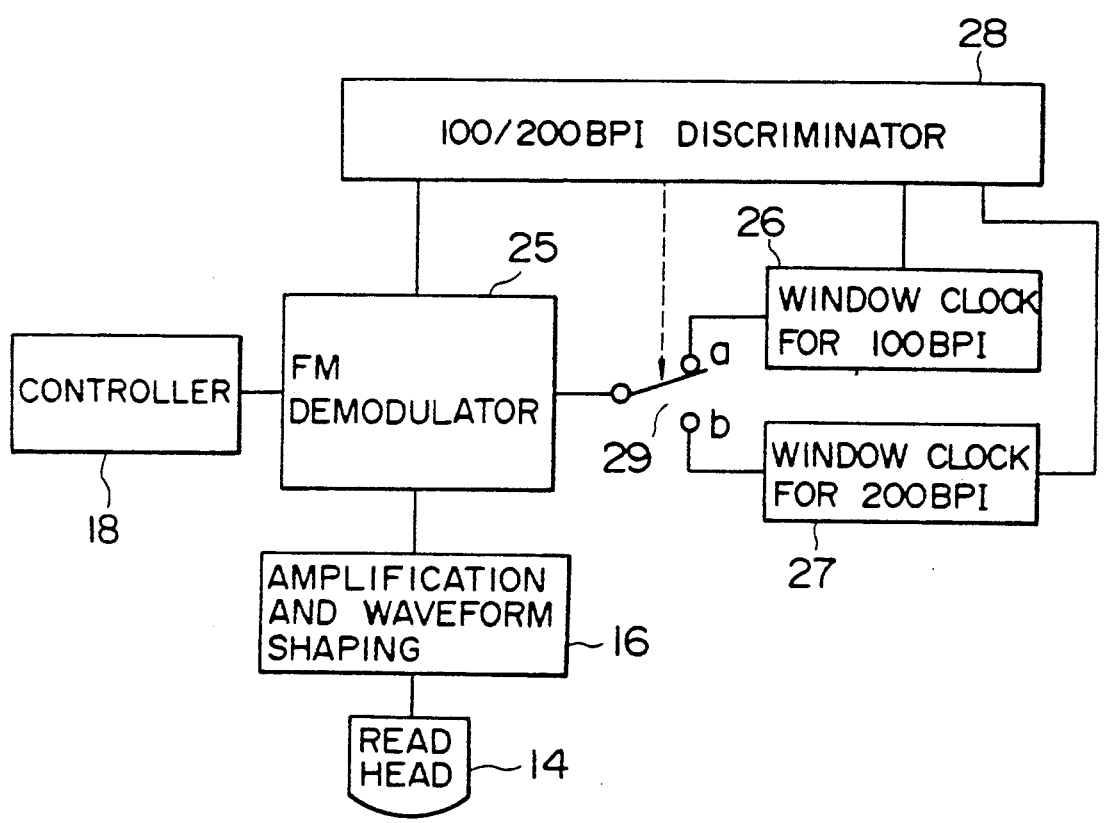

FIG. 4 shows a principal part of a terminal equipment in which the read head 14 itself is used for mark detection, according to a fourth embodiment of the present invention. In the case of this embodiment, there is no difference in appearance (bar code 12, hole 23, cutout 24 and the like) between a new ticket and an existing ticket. Therefore, assuming that "OF" (0, 0, 0, 0, 0, 1, 1, 1, 1,) is always recorded at the head of information as a magnetic record format of a toll road ticket, this "OF" portion is utilized as a mark.

In other words, when the "OF" portion of the existing ticket recorded at 100 BPI is demodulated in 100 BPI, the first two bits naturally appear to be (0,0), but when the "OF" portion of the new ticket recorded at 200 BPI is demodulated in 100 BPI, the first two bits appear to be (1,1), thus making it possible to discriminate between ticket types.

In FIG. 4, there are featured in the terminal equipment an FM demodulator 25, a window clock generator 26 for 100 BPI, a window clock generator 27 for 200 BPI, a discriminator 28 and a change-over switch 29. The change-over switch 29 is controlled by the discriminator 28, but is usually connected with contact a and supplies a window clock for 100 BPI to the FM demodulator 25. Thus, the FM demodulator 25 usually receives the output signal of the read head 14 through the amplification and waveform shaping portion 16 and performs FM demodulation in 100 BPI. Then, when the ticket arrives, the discriminator 28 discriminates from the demodulated output of the FM demodulator 25 to determine whether the first two bits of the "OF" portion are (0,0) or (1,1). If the bits are (0,0), the discriminator 28 determines the ticket to be an existing ticket and leaves the change-over switch 29 as it is, and controls the FM demodulator 25 to operate at 100 BPI. Conversely, if the first two bits of the "OF" portion are (1,1), the discriminator 28 determines the ticket to be a new ticket of 200 BPI, and connects the change-over switch 29 with contact b so as to supply a window clock for 200 BPI to the FM demodulator 25, and controls the FM demodulator 25 to operate at 200 BPI.

The controller 18 receives the demodulated output of the FM demodulator 25 so as to take in magnetic record information of the ticket in the case of an existing ticket or a new ticket. The controller 189 performs a predetermined processing based on this information, and records the processed information in the magnetic stripe MS of the ticket at a high magnetic recording density such as 200 BPI with a write head (not shown). Furthermore, the controller 18 confirms whether the information has been written correctly or not by reading the recorded information immediately thereafter. The ticket is also to be transported so as to reciprocate in the terminal equipment, and the new information is written in a return trip. The read head 14 is used for confirmation immediately thereafter, and the change-over switch 29 is switched to contact b so that the FM demodulator 25 operates at 200 BPI.

The above-described terminal equipment is used both in an exit gate and an entrance gate.

According to a magnetic information read method of the present invention, it is possible to perform correct demodulation in accordance with the magnetic recording density by detecting a mark with existing terminal equipment and new terminal equipment even if tickets having different magnetic recording densities coexist.

Figure 5:
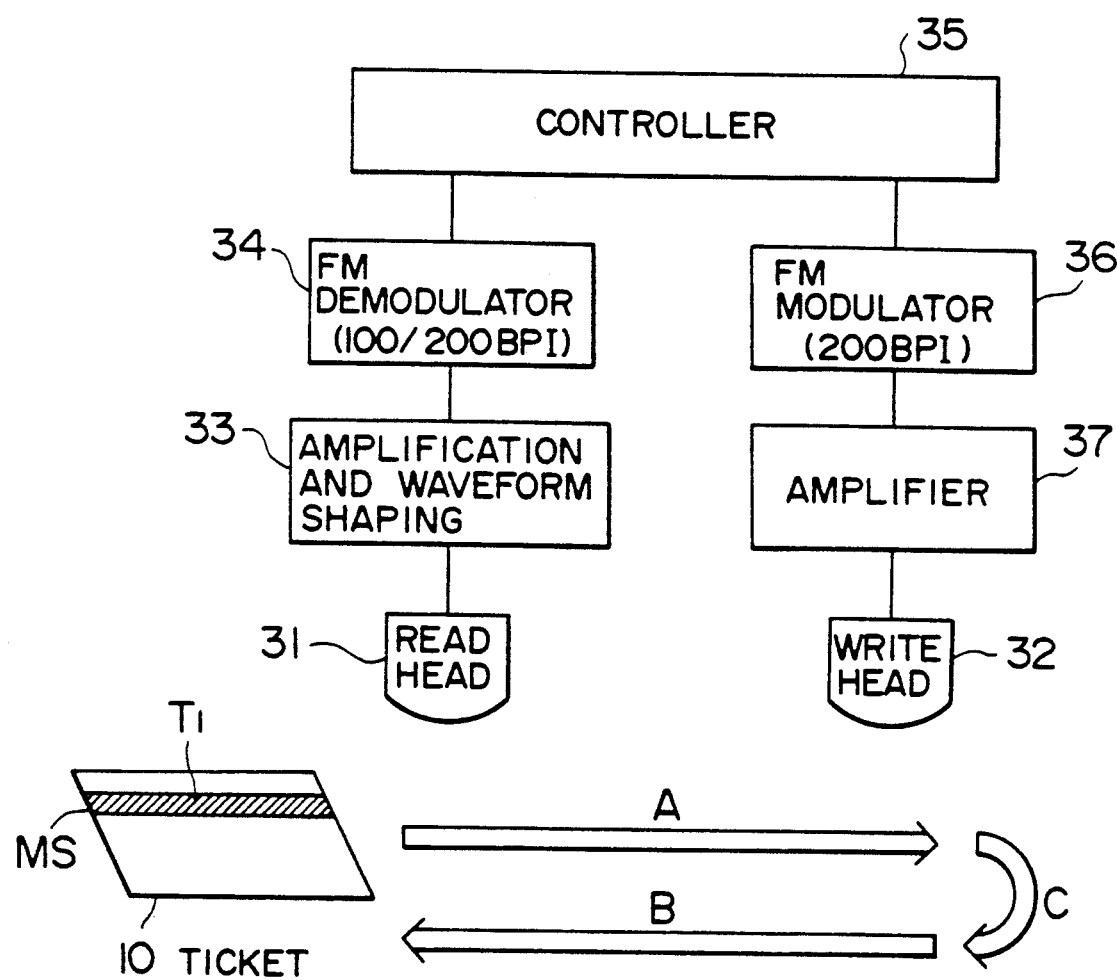
FIG. 5 to FIG. 8 show a magnetic record conversion method of the present invention.

FIG. 5 shows a principal part of a terminal equipment in which one wide tract T1 is formed in the magnetic stripe MS of the ticket 10 as is done with existing equipment. There are provided in this terminal equipment one track's worth of a read head 31 and a write head 32, an amplification and waveform shaping circuit 33, an FM demodulator 34, a controller 35, an FM modulator 36 and an amplifier 37. The ticket 10 is transported so as to reciprocate in the terminal equipment. A indicates an inward trip, B indicates a return trip, and C indicates a temporary stop. In the inward trip, the previously recorded information of 100 BPI is read from the magnetic strip MS with the read head 31, and new information is written in 200 BPI by means of write head 32 in the return trip, then the recorded contents are confirmed by reading information of 200 BPI with the read head 31. A transport mechanism and the like will be described later with reference to FIG. 18 to FIG. 23.

In FIG. 5, the FM demodulator 34 is able to demodulate at both 100 BPI and 200 BPI by a command from the controller 35. Then, the ticket 10 is transported in the inward trip A, the FM demodulator 34 receives an output signal of 100 BPI of the read head 31 through the amplification and waveform shaping portion 33 and demodulates the output signal at 100 BPI, thereby to supply entrance gate information of 100 BPI which has previously been recorded in the ticket 10 by the existing equipment to the controller 35. The controller 35 generates exit gate information and supplies the exit gate information to the write head 32 through the FM modulator 36 and the amplifier 37 for recording when the ticket 10 is transported in the return trip B. The FM modulator 36 operates at 200 BPI, thus obtaining a recording capacity twice as large as that of the existing equipment. Further, while the ticket 10 is being transported in the return trip B, the controller 35 controls the FM demodulator 34 to operate in 200 BPI, receives an output signal of 200 BPI on the read head 31 after demodulation, and confirms whether the exit gate information has been recorded correctly or not. Incidentally, recording of the exit gate information may be made by overwriting using any of three areas in the same manner as before or overwriting on the whole of one track. Further, it may be applied to recording not only at an exit gate, but also at an entrance gate.

Figure 6:
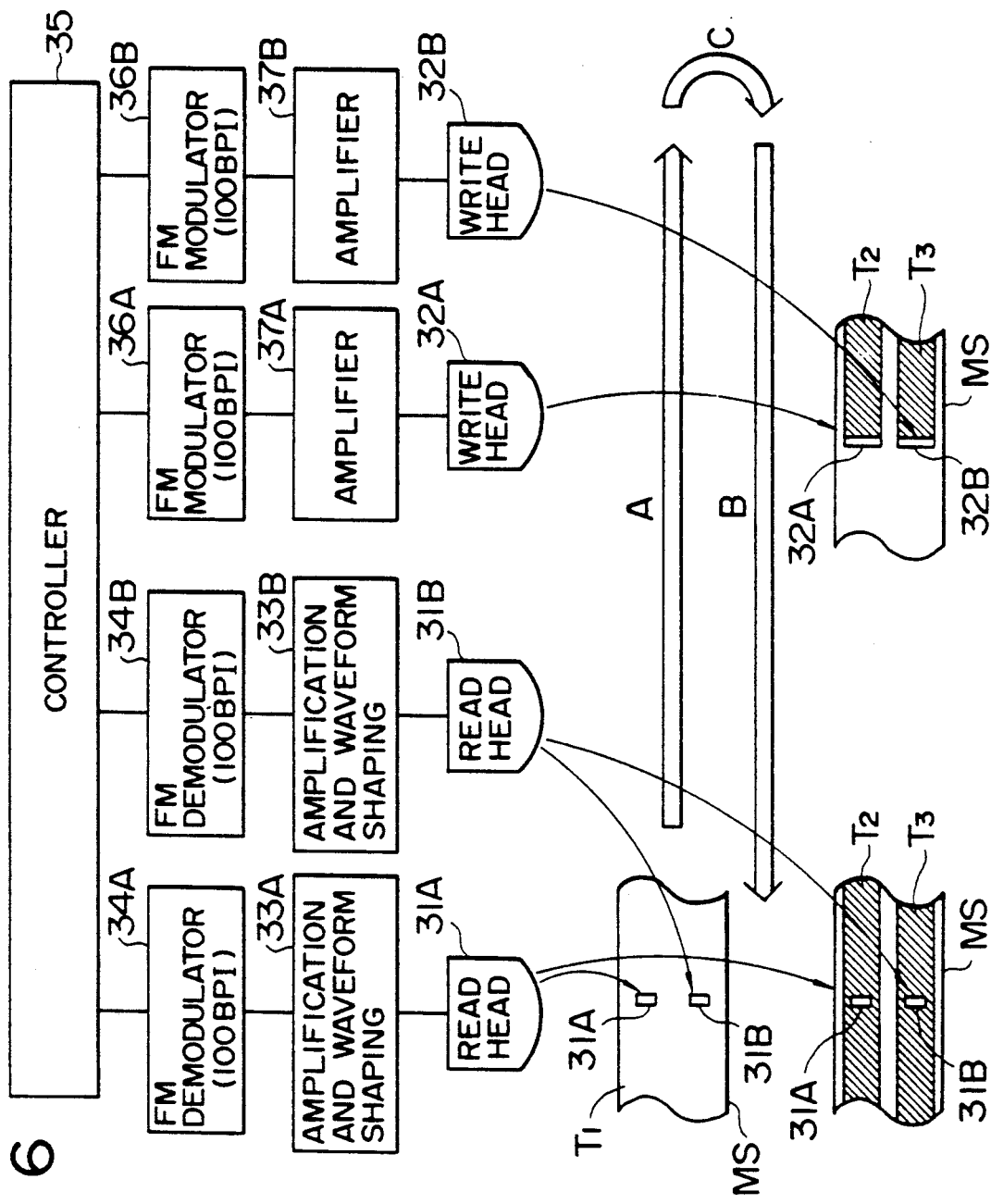

FIG. 6 shows a principal part of a terminal equipment, in which, there are, different from an existing equipment, two lines of tracks T2 and T3 formed in the magnetic stripe MS of the ticket 10 as a sixth embodiment. In this terminal equipment, there are arranged two read heads 31A and 31B and two write heads 32A and 32B side-by-side at a right angle to the travel direction. Further, the read heads 31A and 31B are respectively connected with input terminals of the controller 35 through amplification and waveform shaping portions 33A and 33B and FM demodulator 34A and 34B, and the respective output terminals of the controller 35 are connected with write heads 32A and 32B through FM modulators 36A and 36B and amplifiers 37A and 37B. The FM demodulator 34A and 34B and the FM modulators 36A and 36B are of 100 BPI similar to the existing equipment.

In operation, when the ticket 10 is being transported in the inward trip A, the controller 35 takes in information at an entrance gate or the like in 100 BPI which has already been recorded in one wide track T1 with existing equipment by using an output of either the FM demodulator 34A or 34B. Then, the controller 35 generates information at an exit gate, divides it for two tracks, supplies it to FM modulators 36A and 36B while the ticket 10 is being transported in the return trip B, and controls the write heads 32A and 32B to record the information in respective tracks T2 and T3 in 100 BPI. As a result, the bit density is same as for existing equipment, but the recording capacity is doubled since there are two lines of tracks. In addition, the controller 35 receives information at 100 BPI from FM demodulator 34A and 34B after writing, and confirms whether new information at an exit gate has been recorded correctly or not in the respective tracks.

Figure 7:
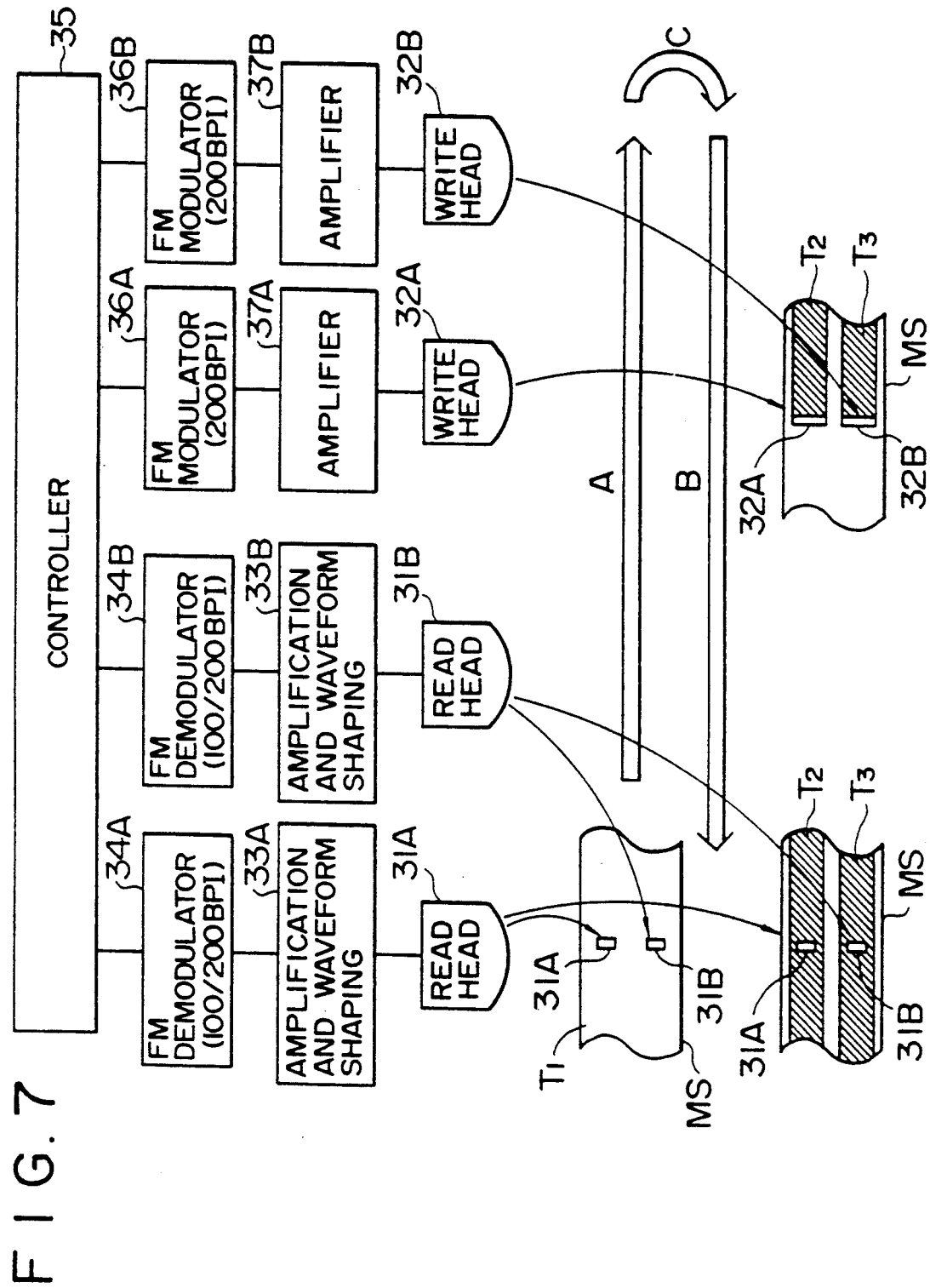

FIG. 7 shows a seventh embodiment. This is a modification of the sixth embodiment shown in FIG. 6, in which two FM demodulators 34A and 34B are able to demodulate both 100 BPI and 200 BPI by a command from the controller 35, and two FM modulators 36A and 36B perform FM modulation of 200 BPI. The arrangement of respective two read heads 31A and 31B and write heads 32A and 32B is the same as that in the sixth embodiment, and two lines of tracks T2 and T3 are formed in the magnetic stripe MS. In this configuration, the recording capacity is four times as large as that of existing equipment. In operation, the controller 35 takes the entrance gate information of 100 BPI which has been already recorded by the existing equipment into one wide track T1 by 100 BPI demodulation operation of either FM demodulator 34A or 34B while the ticket 10 is being transported in the inward trip A. Then, the exit gate information is generated and divided into two track portions, and is given to two FM modulators 36A and 36B when the ticket 10 is being transported in the return trip B, thus recording in respective tracks T2 and T3 in 200 BPI, by means of two write heads 32A and 32B. After writing, the controller 35 receives information associated with the respective tracks by 200 BPI demodulation operation of FM demodulators 34A and 34B and determines whether recording has been made correctly or not.

Figure 8:
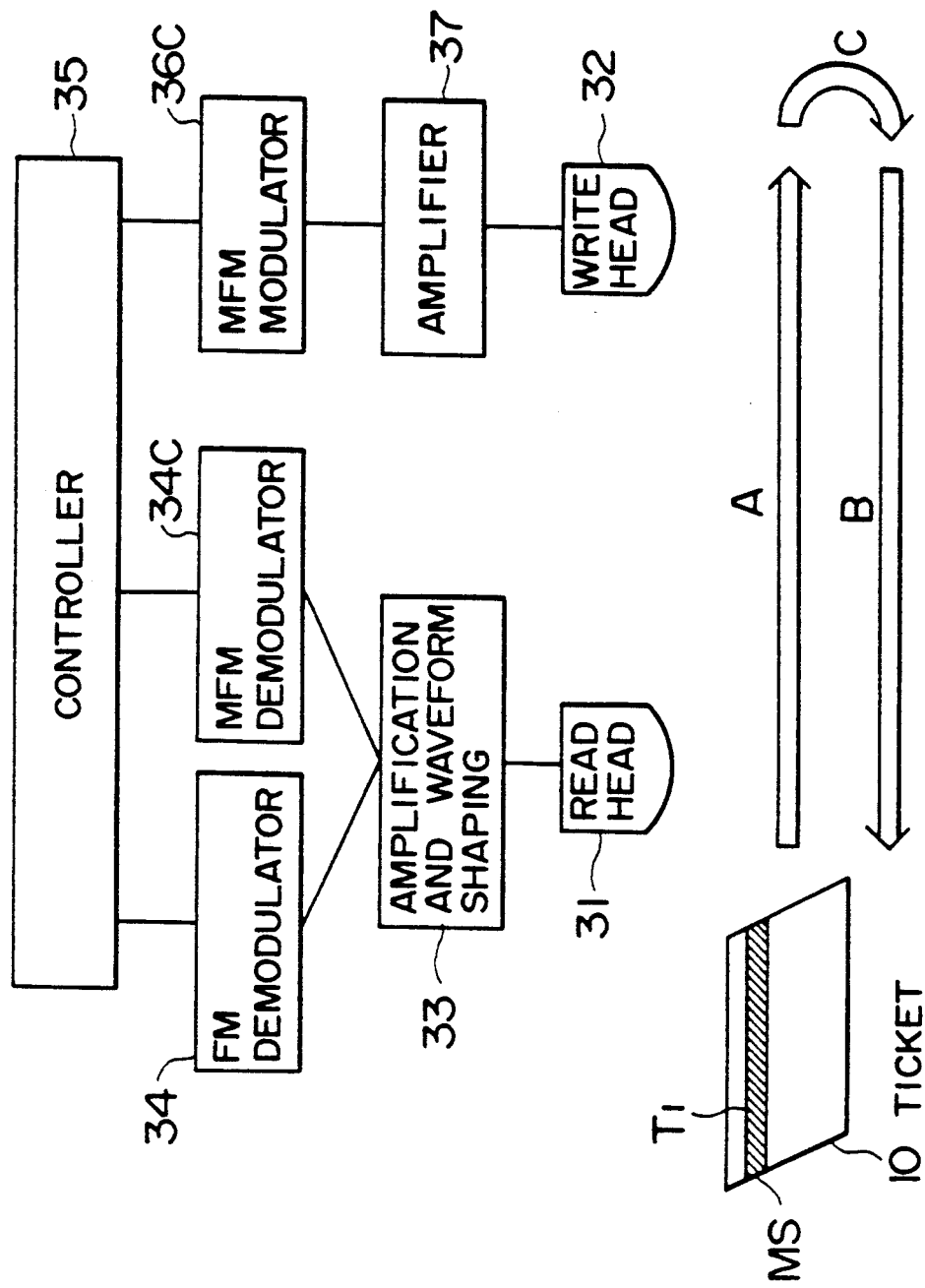

FIG. 8 shows a principal part of a terminal equipment using an MFM system, according to an eighth embodiment. There is only one line of wide track, and the read head 31 and the write head 32 are the same as that in existing equipment of 100 BPI. Further, there are provided an MFM demodulator 34C of 200 BPI and an MFM modulator 36C of 200 BPI in addition to the existing demodulator 35 of 100 BPI.

In operation, the controller 35 takes in the entrance gate information of 100 BPI which has already been recorded in one wide track T1 by the existing equipment through a read head 31, an amplification and waveform shaping portion 33 and an FM demodulator 34 of 100 BPI when the ticket 20 is being transported in the inward trip A. Then, exit gate information is generated and is supplied to the MFM modulator 36C when the ticket 10 is transported in the return trip B, and recording at 200 BPI is made by means of the write head 32. In this case, even if the bit density is 200 BPI, the flux variation is the same for the FM system of the existing equipment. After writing, the controller 35 receives information at 200 BPI from the MFM demodulator 34C, and confirms whether the exit gate information has been recorded correctly.

The MFM system is applicable to any of the above-described embodiments, so as to increase the recording capacity in each embodiment.

Incidentally, in any of the sixth, the seventh and the eighth embodiments, recording of the exit gate information may be made by overwriting using one of the three areas in the same manner as described above, or by overwriting entirely over one track. Further, the same is applicable to recording not only at an exit gate, but also at an entrance gate.

According to the magnetic record conversion method of the present invention, it is possible to increase the recording capacity of the ticket even when existing terminal equipment and a new terminal equipment coexist.

A digital recording/reproducing circuit of the present invention will be described in detail hereinafter with reference to the embodiments shown in FIG. 10 to FIG. 15. A digital magnetic recording/reproducing circuit according to the present embodiment is capable of recording with any of three magnetic recording densities, 100 BPI, 200 BPI and 400 BPI, in accordance with a command when it is assumed that the maximum number of magnetization inversion is at 400 FRPI, and encodes with the FM system for 100 BPI, with both the FM system and the MFM system for 200 BPI and with the MFM system for 400 BPI. Further, reading may be made irrespective of the magnetic recording density at 100 BPI, 200 BPI or 400 BPI, and regardless of whether the FM system or the MFM system is used.

Figure 10:
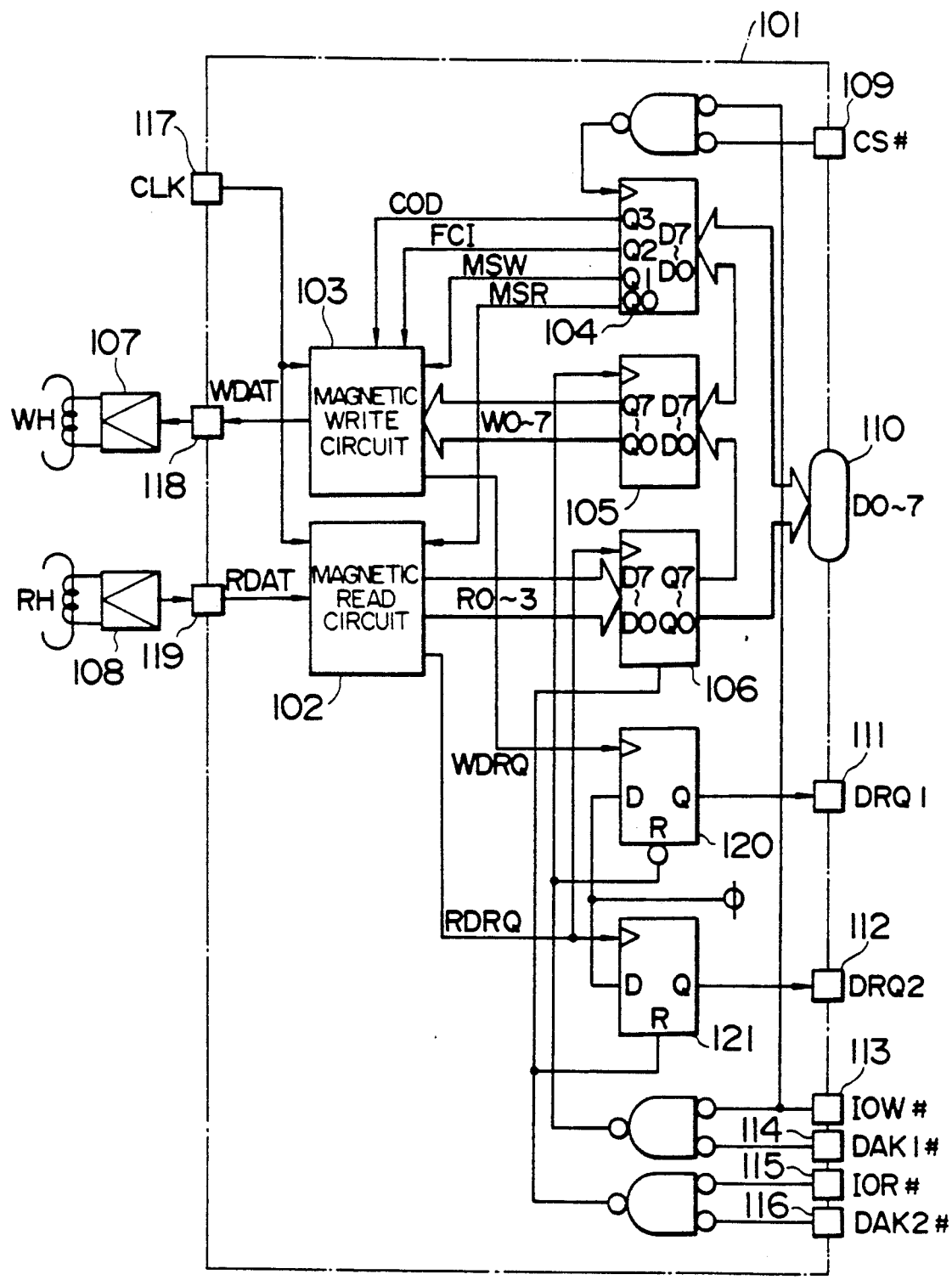
FIG. 10 is a general diagram showing an embodiment of a digital recording/regenerating circuit of the present invention.

FIG. 10 is a circuit diagram showing the general construction of a digital recording/reproducing circuit 101 for a magnetic card according to a ninth embodiment of the present invention. This circuit 101 is constructed so that it is connected with a bus of a microcomputer (CPU) system, and performs read/write of a magnetic card in accordance with a command from the CPU and data transfer with a memory of the CPU system by direct memory access (DMA) employing a universal DMA controller. Thus, standardization with ASCI and the like may be achieved. For simplicity, the CPU system DMA controller and the magnetic card are not shown.

In FIG. 10, a numeral 102 denotes a magnetic read circuit, 103 denotes a magnetic write circuit, 104 denotes a command register, 105 denotes a data input latch, 106 denotes a data output latch, 107 denotes an amplifier for magnetic recording, 108 denotes an amplifier for magnetic regeneration, and 109 to 119 denote input/output terminals of respective interface signals.

Among the interface signals, CS# indicates a chip selecting signal, IOW# indicates a write signal, IOR#indicates a read signal, and D0 to D7 indicate bus signals, and a command from the CPU is written in a command register 104. Further, among the bits of the command register 104, a magnetic data read command MSR is allocated to Q0, a magnetic data write command MSW is allocated to Q1, a command FCI which selects the number of magnetization inversion when writing to 1:2 is allocated to Q2, and a command COD for selecting the encoding system when writing to the FM system or the MFM system is allocated to Q3, respectively.

In the present embodiment, when the maximum number of magnetization inversion is set at 400 FRPI, the recordable magnetic recording density is set to 100 BPI, 200 BPI and 400 BPI by the combination of respective change-over commands FCI and COD as shown in Table 1.

TABLE 1

| Combination when the max. FRPI is 400 | | COD "0" FM system | COD "1" MFM system |
|---|---|---|---|
| FCI | "0" 200 FRPI | 100 BPI | 200 BPI |
| | "1" 400 FRPI | 200 BPI | 400 BPI |

Further, in the present embodiment, the minimum bit period Tb min of an MFM code becomes Tb min = 25.4/(400×600) = 105.8μ when the transport speed of the magnetic card is set at 600 mm/s. Thus, a clock having a period of 3.3 μs which is obtainable by dividing 105.8 μs by 32 is supplied externally as a fundamental clock CLK in FIG. 10, and all the timings are generated based on this fundamental clock CLK.

In FIG. 10, DRQ1 and DRQ2 are demand signals to a DMA controller and are output through output latches 102 and 121. Further, DAK#1 and DAK#2 are response signals from the DMA controller. These are used for data transfer between the circuit 101 and a memory. W0-7 indicates data to a write circuit 103, WDAT indicates data to an amplifier 107 for recording obtained by encoding W0-7, RDAT indicates data from an amplifier 108 for reproducing, and R0-3 indicates data obtained by decoding RDAT in a read circuit 102.

Figure 11:
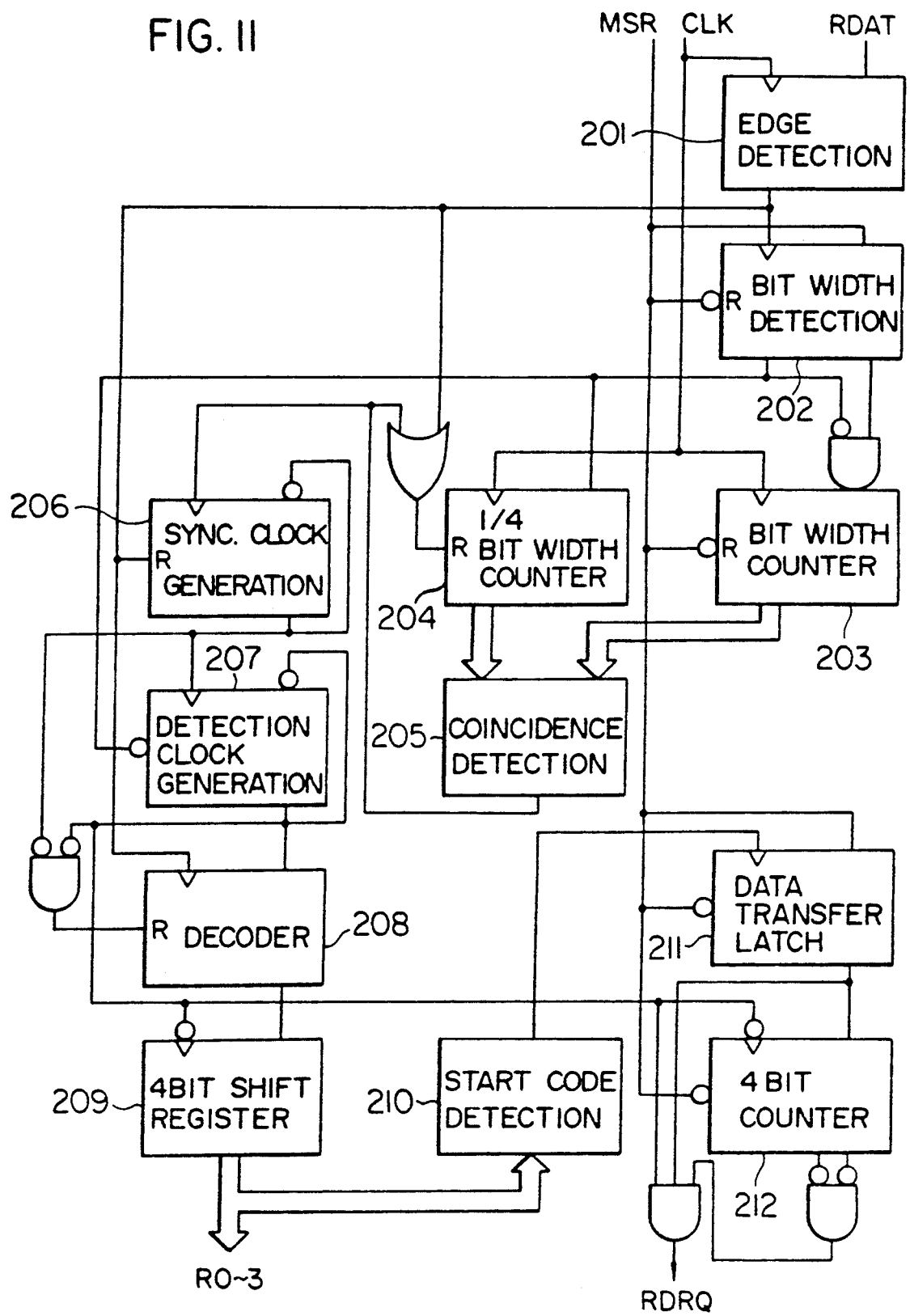
FIG. 11 shows a read circuit.
Figure 12:
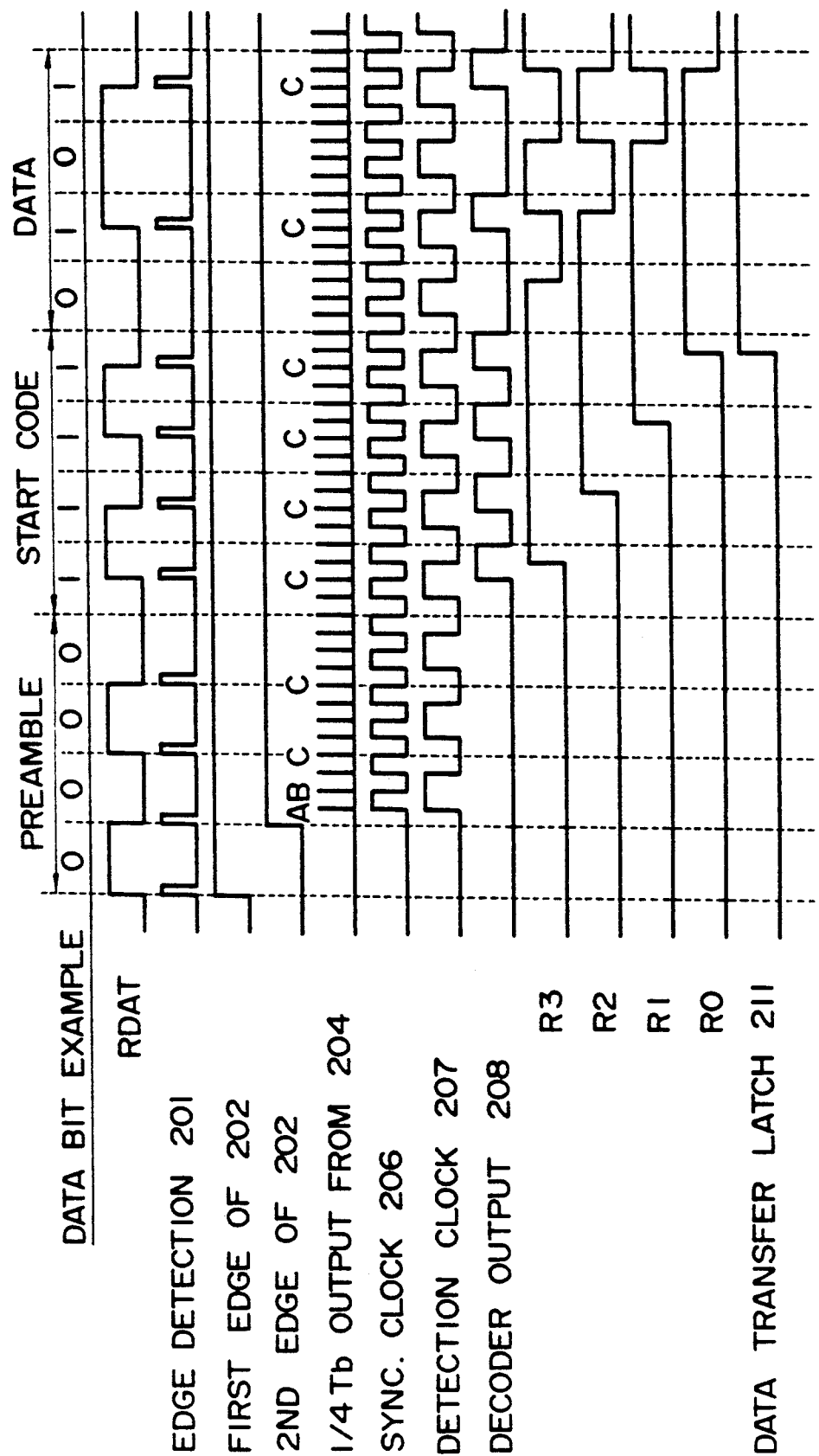
FIG. 12 and FIG. 13 show examples of read timing charts.
Figure 13:
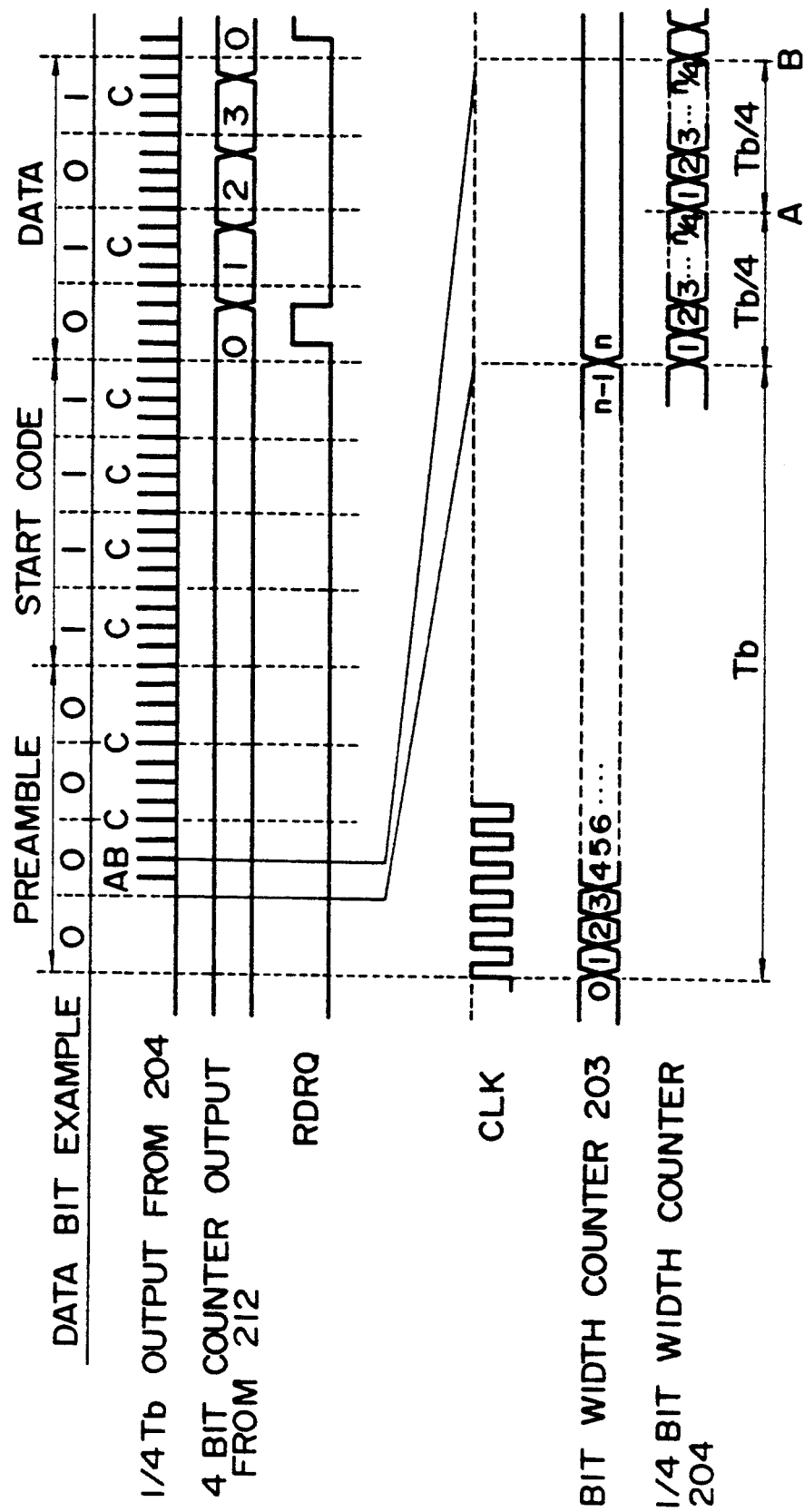

Next, a concrete example of digital reproduction, will be described with reference to FIG. 11 through FIG. 13. FIG. 11 shows a circuit diagram, in which circuits 201 and 212 form the digital reproduction circuit 102. FIG. 12 and FIG. 13 show timing charts thereof. Here, the same reference numbers refer to a corresponding circuits and the timing thereof as those shown in FIG. 11, FIG. 12 and FIG. 13.

In FIG. 11, the circuit 201 detects magnetization inversion of the reproduced data RDAT using the fundamental clock CLK and outputs an edge detection pulse. The circuit 202 denotes the widths of the first edge and the second edge, and enables the bit width counter 203. The bit width counter 203 counts the interval Tb between the first edge and the second edge with respect to the fundamental clock CLK. In the present embodiment, 100 FRPI is reached at a card transport speed of 600 mm/s, and the maximum bit period at 423.2 μs is produced for FM recording. Therefore, a count capacity of 128 or more is required when the interval is counted with the fundamental clock CLK having a period of 3.3 μs, and an 8-bit binary counter is used.

The circuit 204 is a counter for counting ¼ of the count value Tb of the bit width counter 203 on or after detection of the second edge in the circuit 202, on or after bit synchronization, and a 6-bit binary counter is used. This ¼ bit width counter 204 is reset every time the edge is detected and when 6 bits, excluding the last two bits of the bit width counter 203, and 6 bits output from the ¼ bit width counter 204 are compared and round to coincide with each other (every count of ¼ bit width) in the coincidence detection circuit 205.

The circuit 206 generates a synchronizing clock which inverts the output thereof every time the edge is detected and every time the coincidence detection circuit 205 detects coincidence. In other words, the synchronizing clock is reset at every magnetization inversion to a low level and inverts at every Tb/4 count.

The circuit 207 generates a detection clock which divides by two the frequency of the synchronizing clock generated in the synchronizing clock generating circuit 206 and serves as a detection window when decoding. That is, the detection clock reaches a high level during ±¼ Tb with respect to respective bit cell centers, which is the detection window width.

The circuit 208 is a decoder for decoding the reproduced data RDAT by sampling the detection clock every time the edge is detected. Namely, when the detection clock is at a high level when the edge is detected, the data bit is set to "1".

The circuit 209 is a 4-bit shift register which shifts the output of the decoder 208 as input data every time the detection clock from the detection clock generating circuit 207 falls, and outputs decoded data RO-3.

The circuit 210 detects, when the output of the 4-bit shift register 209 is a continuous 4-bit data of logic "1", a start code for digit synchronization, and sets the data transfer latch 211 so as to enable a 4-bit counter 212.

The 4-bit counter 212 counts 0, 1, 2, 3, 0, 1 . . . repeatedly every time the detection clock rises and generates a DMA demand signal WDRQ having a detection clock width when this output is zero, for every 4 bits when digit synchronization is obtained, and latches outputs R0-3 of the 4-bit shift register 209 to a data output latch 106 shown in FIG. 10, and transfers the output to the memory with DMA. Transfer to the memory is made in the units of one byte (8 bits), but the last four bits are valid digits.

Among the outputs of the ¼ bit width counter 204 in the timing charts shown in FIG. 12 and FIG. 13, the output portion designated C is not generated because the ¼ bit width counter 204 is reset when the edge is detected.

Figure 14:
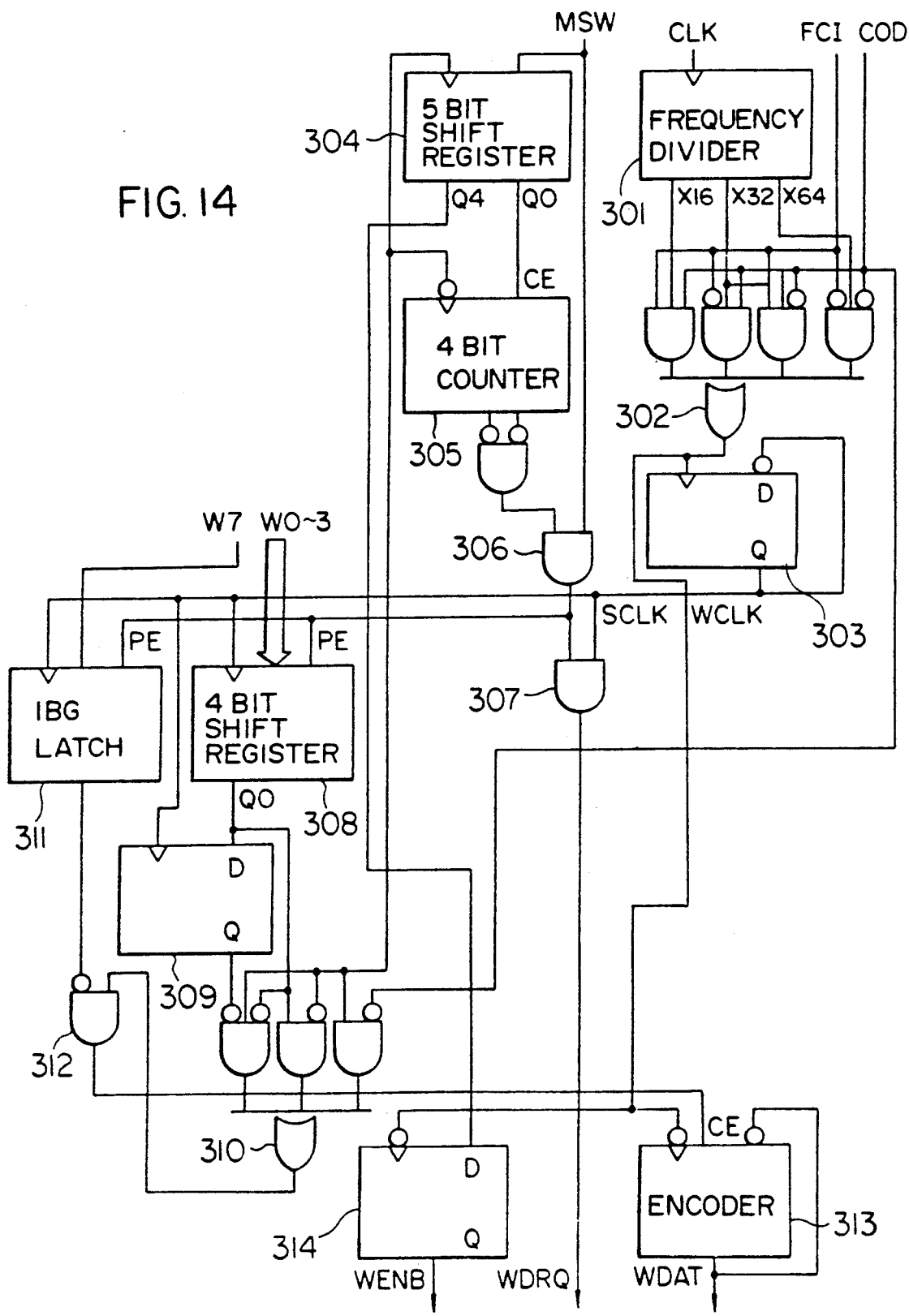
FIG. 14 shows a write circuit.
Figure 15:
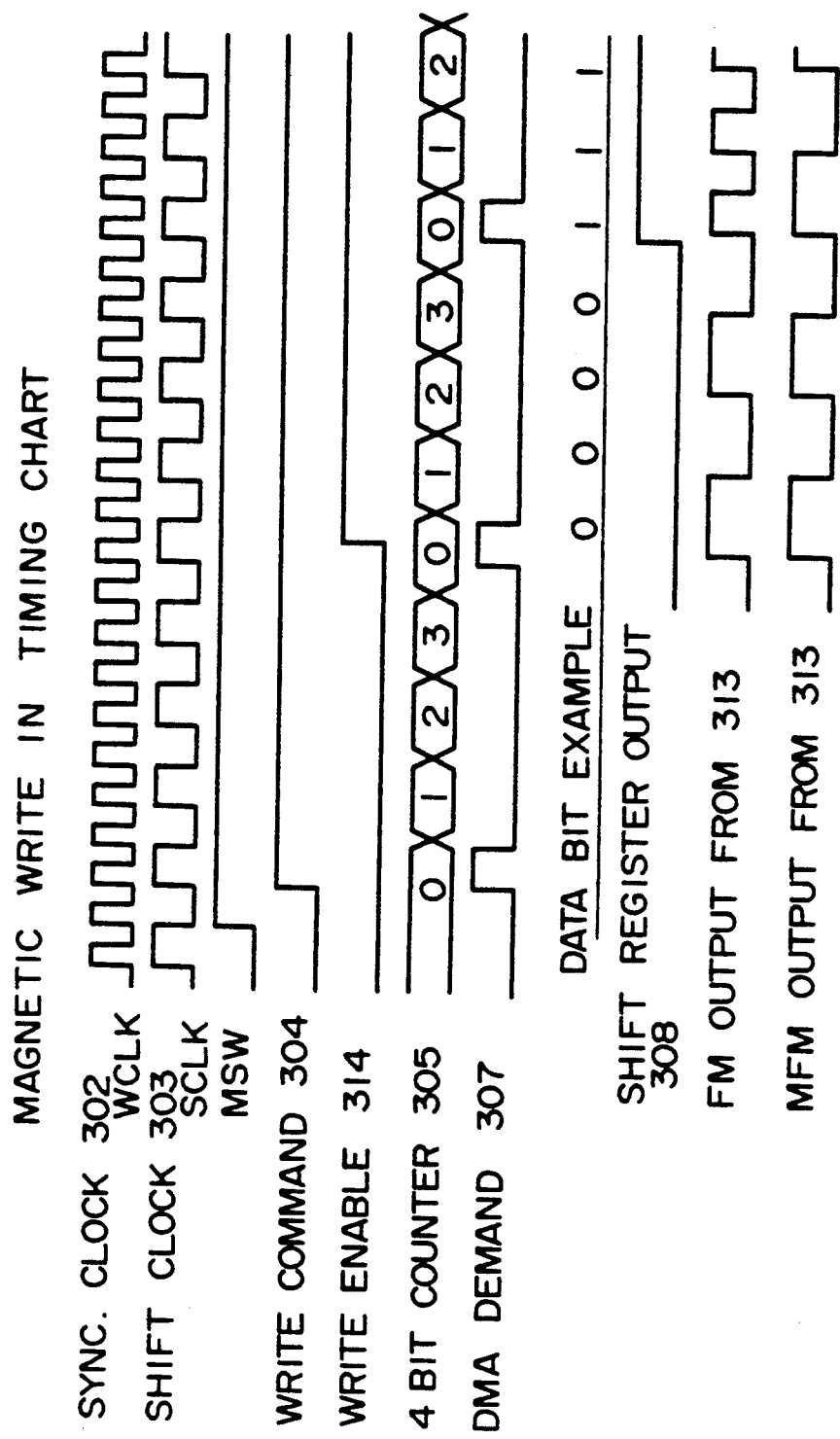
FIG. 15 is a timing chart of the write circuit.
Figure 16:
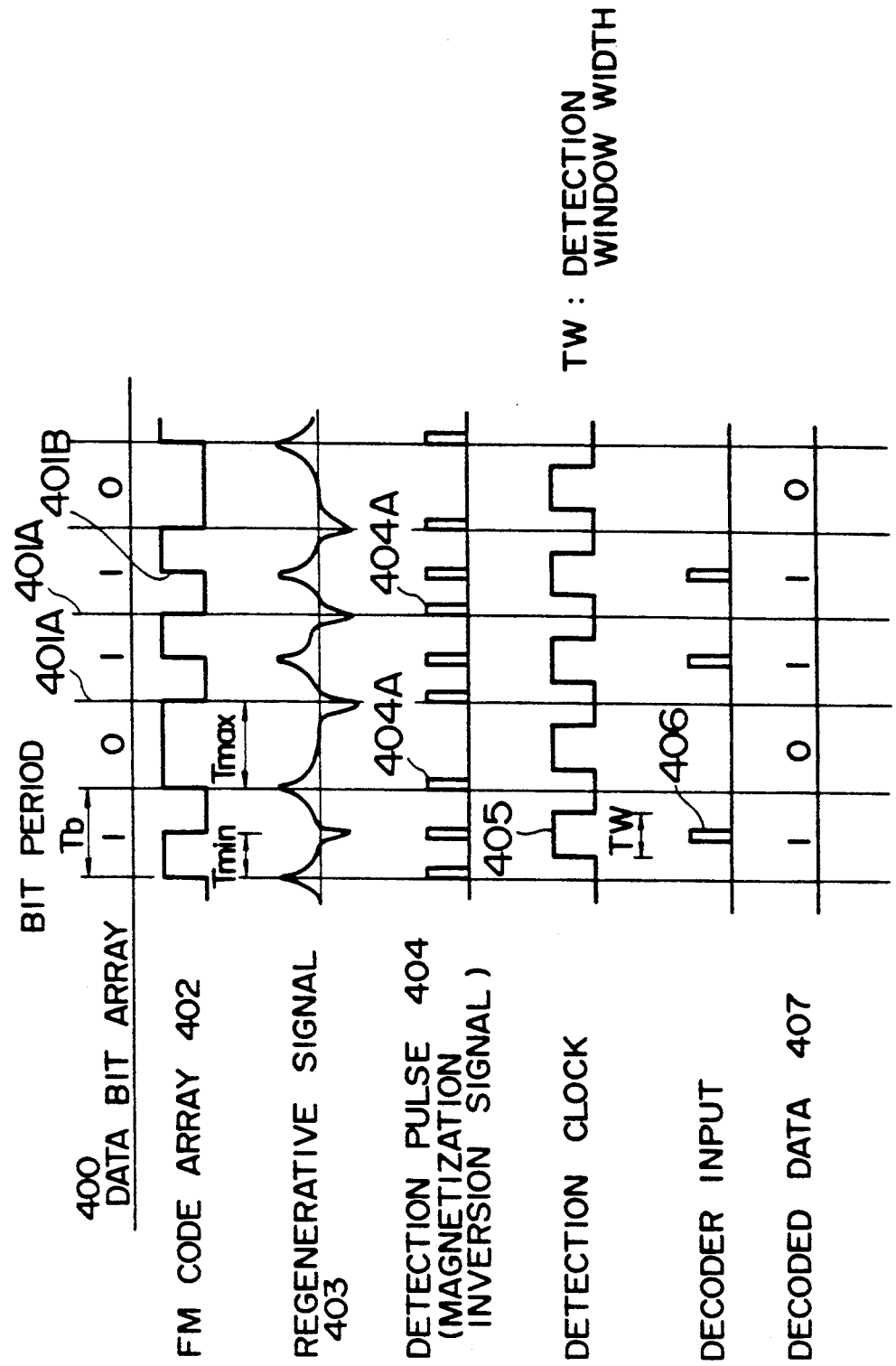
FIG. 16 is a timing chart showing a recording example by the FM system.
Figure 17:
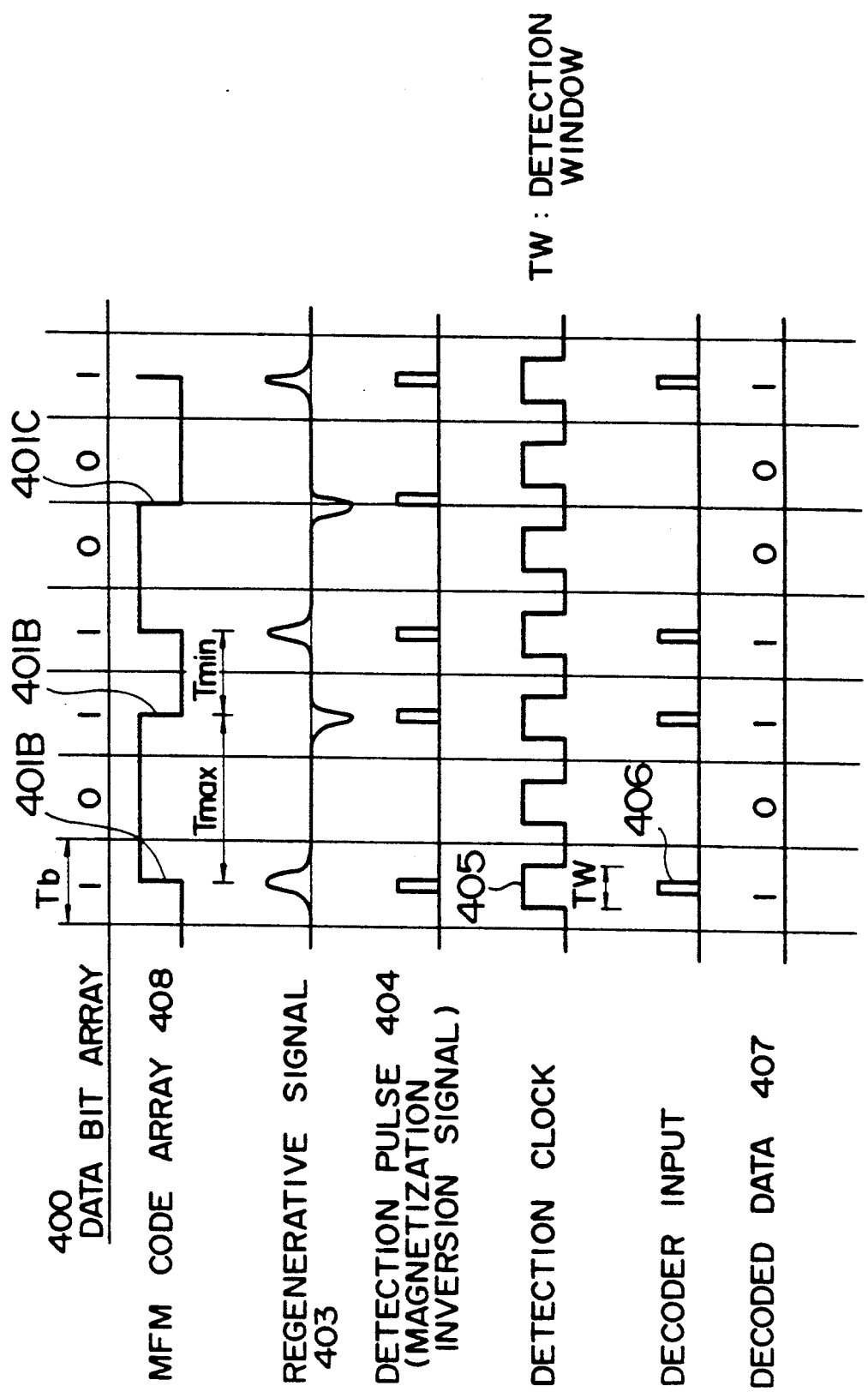
FIG. 17 is a timing chart showing a recording example by the MFM system.

Next, a concrete example of digital recording, using the magnetic write circuit 103 will be described with reference to FIG. 14 and FIG. 15. FIG. 14 shows a circuit diagram, in which circuits 301 to 314 form a digital recording circuit 103. FIG. 15 shows a timing chart. Here, like reference numerals refer to the corresponding circuit and the timing thereof in FIG. 14 and FIG. 15.

In FIG. 14, the circuit 301 is a frequency divider circuit which divides the fundamental clock CLK having a period of 3.3 μs into three output clock signals having frequencies 16 times, 32 times and 64 times, respectively, the frequency of the fundamental clock signal. In addition, in response to a combination of commands 200 FRPI (FCI="0") or 400 FRPI (FCI="1") for magnetization inversion at the card transport speed of 600 mm/s and commands FM (COD="0") or MFM (COD="1") of record encoding system, circuit 301 generates clocks having periods of 52.8 μs, 105.6 μs and 211.2 μs corresponding to ½ of respective bit periods of magnetic recording densities 400 BPI, 200 BPI and 100 BPI.

The circuit 302 is a gate which selects a clock having a corresponding period from the frequency divider circuit 301 by the combination of respective commands FCI and COD, and outputs it as the synchronizing clock WCLK.

The circuit 303 is a D type latch which divides by two the synchronizing clock WCLK from the gate circuit 302 so as to generate a shift clock SCLK.

The circuit 304 is a 5-bit shift register which causes a magnetic write command MSW set by the CPU to synchronize with the shift clock SCLK from the latch 303 so as to enable the 4-bit counter 305, and generates a write data enable signal WENB synchronized to the fall of the synchronizing clock in the D type latch 314 and to the output timing of the encoder 313.

The 4-bit counter counts 0, 1, 2, 3, 0, 1, . . . repeatedly, and generates a DMA demand signal WDRQ having the width of the shift clock SCLK through gates 306 and 307 when the output of the 4-bit counter 305 is zero, for every four bits, and transfers the outputs W0-7 of the data input latch 105 shown in FIG. 10 into the 4-bit shift register 308 and the IBG latch 311 shown in FIG. 14.

The 4-bit shift register 308 shifts out 4-bit data W0-3 from the LSB of the outputs W0-7 of the data input latch 105 synchronously with the shift clock SCLK.

The circuit 309 is a D type latch for further delaying the shifted outputs W0-3 of the 4-bit shift register 308, and focuses on bit cell boundary detection for magnetization inversion at the bit cell boundary where data bits are continuous "0".

The circuit 310 is a gate which carries out the change of the encoding systems with the command COD by controlling a clock enable signal CE of the encoder 313.

The encoder 313 inverts the output at the fall of the synchronizing clock when the clock is enabled, and encodes by way of the FM system or the MFM system in accordance with the output of the gate circuit 310. The data from the memory are transferred in byte units, and the last four bits W0-3 are valid digits. When the most significant bit W7 is "1" as latched by the IGB latch 311, the bit W7 is used for 4 bit period by the gate 312 in order to prohibit clock enable of the encoder 313 so as not to perform output inversion, that is, to record by d.c. magnetization among data blocks.

In the timing chart shown in FIG. 15, data W0-7 received against the DMA demand (WDRQ) output from the gate 307 are incorporated into the shift register 308 at the next DMA demand timing, that is, after delaying by a four bit period.

Further, in FIG. 15, data (FM output) is the FM system and data (MFM output) in the MFM system which are output from the encoder 306 illustrate the case in which magnetic recording densities are the same.

According to a digital recording/reproducing circuit of the present invention, it is possible to record data at a magnetic recording density twice as high as a conventional FM system due to the fact that the MFM system is adopted for the record encoding system for a magnetic card. Therefore, it is possible to double the information recording capacity of the magnetic card.

In this case, whereas bit synchronism poses a problem in the MFM system, the circuitry of the present invention makes it possible to reobtain synchronization at the time of magnetization inversion detection at bit cell boundaries where data bits "0" are continuous and at bit cell centers of data bits "1", thus enhancing synchronism.

Further, MFM or FM may be selected as the encoding system by a command, and the synchronizing clock in encoding may also be selected. Accordingly, if the magnetic recording capacity is planned to be increased in a magnetic card system which is already in operation, the circuit of the present invention may be put in use with existing equipment during the replacement period. For example, it is possible that the existing equipment reads a magnetic card recorded in 100 BPI and with the FM system, and the magnetic card is recorded again in 400 BPI and with the MFM system, by the circuit of the present invention.

Furthermore, according to the present invention, when the head of the data of the magnetic card includes data bits "0" continuous over four bits inverting at bit cell boundaries, it is possible to read the magnetic card irrespective of either the FM system or the MFM system or even if the magnetic recording densities are different (for example, 100 BPI to 400 BPI). Thus, the circuit of the present invention can be standardized, making it possible to achieve large cost reductions by expanding the application range.

Turning to FIGS. 18 to 23, terminal equipment applicable with the present invention such as a transport mechanism will be described.

As shown in FIG. 22, a terminal equipment of a toll receiving system of a toll road includes a ticket processing portion 500 with a gateway 501 for receiving a ticket, a card processing portion 600 with a gateway 601 for cards, and processing control portion 3 incorporated in a main body 2 on which a folding type operation display portion 1 is provided rotatably.

On the operation display portion 1, a ten-key pad 4 and a key 5 are provided for turning the power on, and a display panel 6 which is capable of touch-input is provide for special processing. Further, a keyboard having five operation buttons to input a car type and other data, is mounted on a top surface of a hopper stacker 502 of the ticket processing portion 500.

Figure 18:
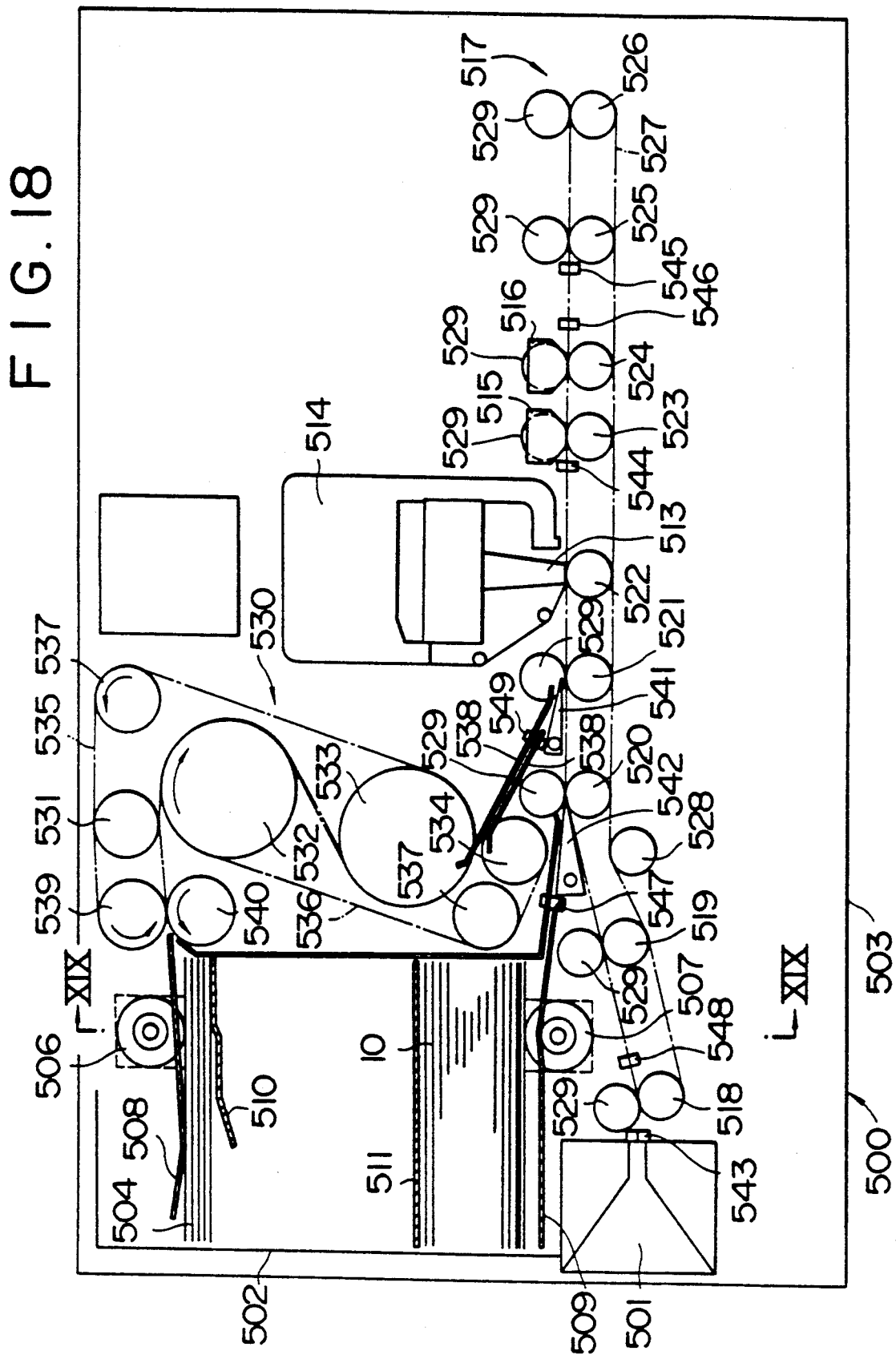
Figure 19:
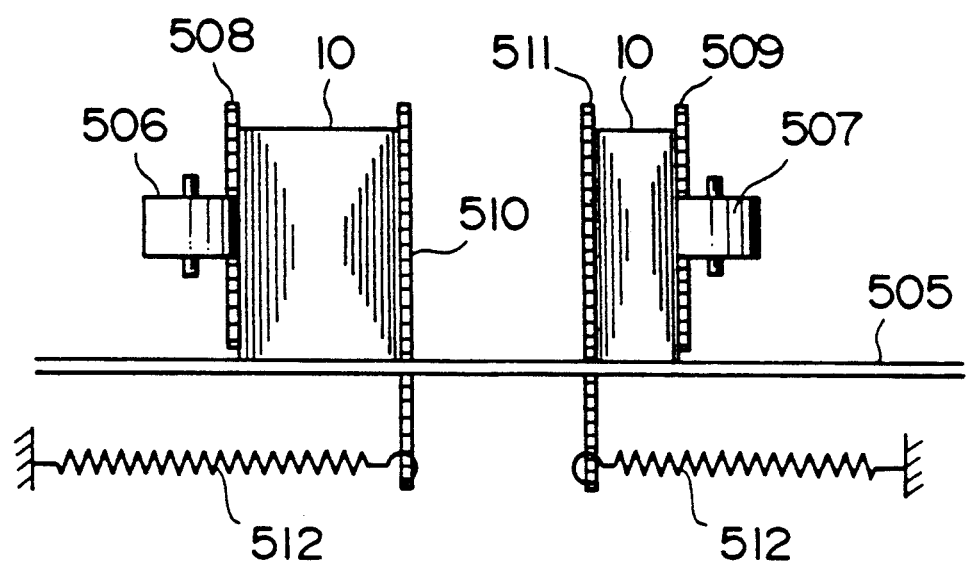

FIG. 18 shows the structure of the ticket processing portion 500. Further, FIG. 19 shows a sectional configuration thereof taken along an arrow mark XIX—XIX. The ticket processing portion 500 processes tickets collectively, and may be used as both a ticket vending machine and a ticket identifying machine similar to a conventional unit. Here, it will be described as a ticket identifying machine at an exit gate.

On the side of the gateway 501 formed at a front end of a cabinet 503, new tickets 10 are stored for reissuance in case a road user loses the ticket, and a hopper stacker 502 (having a handle 505) for withdrawing defective tickets 10 among these new tickets 10, used tickets 10 is removably attached to the main body 2 and the cabinet 503. On both sides of the hopper stacker 502 are provided a delivery roller 506 for delivering new tickets 10 from the hopper stacker 502, and a lead-in roller 507 for leading off-specification tickets 10 among new tickets 10 and used tickets 10 in the hopper stacker 502 They are fitted rotatably to the cabinet 503, respectively. A pair of guide plates 508 and 509 crossing the delivery roller 506 and the lead-in roller 507, respectively, are fixed to the hopper stacker 502. Further, a pair of presser plates 510 and 511 fitted to the hopper stacker 502 are slidably disposed in opposing relation between the guide plates 508 and 509. Presser plates 510 and 511 are energized in opposing directions to respective guide plates 508 and 509 through extension springs 512.

In operation, a new ticket 10 is inserted between the guide plate 508 and the presser plate 510 and is conveyed toward the delivery roller 506 side by the extension spring 512 through the presser plate 510. A used ticket 10 is fed between the guide plate 509 and the presser plate 511 is conveyed toward the lead-in roller 507 side by the extension spring 512 through the presser plate 511.

In the rear of gateway 501 (right side in FIG. 18), there are provided a printer 514 provided with a print head 513 which prints characters, marks and the like onto the ticket 10, a read head 515 for reading magnetic information in a magnetic recording portion (not shown) formed in the ticket 10 and a recording head 516 for writing new magnetic information in the ticket 10. Further, a standby portion 517 which holds the ticket 10 in a "stand by" status temporarily is formed on the most rear end of the ticket processing portion 500.

The present embodiment has been described as a ticket identifying machine, but the printing position on the ticket 10 by the print head 513 is different in case of the use as a ticket vending machine. Therefore, the print head 513 is constructed so that it is movable across the width of the ticket 10 for printing of a plurality of lines of information across the ticket.

The transport line of the ticket 10 is formed within the ticket processing portion 500 so as to connect the standby portion 517 with the gateway 501 through the print head 513, the reproducing head 515 and the recording head 516.

A plurality of driving rollers 518 to 525 which reciprocate the ticket 10 along the transport line are fitted rotatably to the cabinet 503 at an interval shorter than the length of the ticket 10. Through actuation of a pulse motor capable of reciprocating rotation (not shown), one end of timing belt 527 is wound over the driving rollers 518 to 526 to rotate in a reciprocating manner, and any slack of the timing belt 527 is removed by a tension roller 528 interposed between the driving rollers 519 and 520. Further, pinch rollers 529 fitted rotatably with respect to the cabinet 503 across the transport line abut against driving rollers 518 to 521 to 526, except for the driving roller 522 which is located opposite the print head 513.

A ticket feeding unit 530 is provided in the rear of the hopper stacker 500 and feeds new tickets 10 which are pulled out of a hopper stacker 502 by means of the delivery roller 506 to the transport line side between the gateway 501 and the print head 513 in the rear of the hopper stacker 502.

The principal part of the ticket feeding unit 530 is composed of a pair of gripping rollers 531 and 532 located on the delivery roller 506 side; a pair of feed-out rollers 533 and 534 located on the transport line side; a pair of feeding belts 535 and 536 which are wound over the gripping rollers 531 and 532 and feed-out rollers 533 and 534; a pair of tension rollers 537 which are arranged between the gripping rollers 531 and 532 and feed-out rollers 533 and 534; a pair of tension rollers 537 which are arranged between the gripping rollers 531 and 532 and the feed-out rollers 533 and 534 to remove slack in the feeding belts 535 and 536: a pair of new ticket guide plates 538 provided between the feed-out rollers 533 and 534 to remove slack in the feeding belts 535 and 536; and a pair of new ticket guide plates 538 provided between the feed-out rollers 533 and 534 and the driving roller 521 and the pinch roller 529. Further, the gripping roller 531, the feed-out roller 533 and the tension roller 537 on one side are driven to rotate counterclockwise by actuation of a driving source (not shown), and the gripping roller 532, the feed-out roller 534 and the tension roller 537 are driven to rotate clockwise in FIG. 18 synchronously with the above-described rotation.

Further, between the delivery roller 506 and the gripping roller 532, there are provided two rollers. One is a feed-in roller 539 which is driven to rotate in the same direction as the gripping roller 531 and feeds a new ticket 10 pulled out of the hopper stacker 502 to the gripping rollers 531 and 532. The other is a separating roller 540 which opposes the feed-in roller 539 and is driven to rotate in a reverse direction to the feed-in roller 539, and checks passage of two sheets or more of tickets 10 when plural sheets of tickets 10 are fed in.

Thus, a new ticket 10 which is pushed against the delivery roller 506 by means of the extension spring 512, is sent out between the feed-in roller 539 and the separating roller 540 by the rotation of the delivery roller 506. Only one sheet of ticket 10 is sent out into a gap between the feeding belts 535 and 536 between the gripping rollers 531 and 532 by the action of the separating roller 540 which rotates in the reverse direction. Thus, the ticket 10 is sent out on the transport line between the driving roller 521 and the pinch roller 529 from the feed-out rollers 533 and 534 through the new ticket guide plates 538 between the feeding belts 535 and 536.

In addition, a one-way flapper 541 regulates the moving direction of the ticket 10 and is pivoted in an oscillating manner with respect to the cabinet 503 between the new ticket guide plate 538, the driving roller 521 and the pinch roller 529. When the ticket 10 is transported from the standby portion 517 side to the gateway 501 side or the hopper stacker 502 side, the one-way flapper 541 is energized upward as shown in FIG. 18 through a spring member (not shown) so that the ticket 10 is not fed from the new ticket guide plate 538 to the ticket feeding unit 530.

On the other hand, a change-over flapper 542 is provided for changing the transport direction of the ticket 10 if the ticket 10 is transported from the print head 514 to the gateway 501 and if the ticket 10 travelling in the hopper stacker 502 is withdrawn by pivoting in an oscillating manner to the cabinet 503 halfway along the transport line between the driving rollers 519 and 520. The change-over flapper 542 is designed to oscillate by flapper driving means such as a rotary solenoid (not shown).

The operation timing of above-described delivery roller 506 and lead-in roller 507, printer 514, driving rollers 518 to 526, ticket feeding unit 530, flapper driving means is controlled by the processing control portion 3 incorporated in the rear of the main body 2. In this regard, optical sensors 543 to 549, which detect passage of the ticket 10, are arranged halfway along the transport line, between the feed-out roller 533 and 534 of the ticket feeding unit 530 and the one-way flapper 541, between the hopper stacker 502 and the change-over flapper 542, respectively, so as to output a detection signal to the processing control portion 3.

FIG. 20 shows processing steps of the ticket processing portion 500. An operator receives the ticket 10 from a road user who is a customer at a check barrier, an exit gate and the like. When the ticket 10 is inserted into the gateway 501 in a step A1, the optical sensor 543 detects it, and the pulse motor rotates forwardly in a step A2. As a result, the ticket 10 starts to move toward the standby portion 517 side along the transport line. When the optical sensor 544 detects passage of the ticket 10, the read head 511 reads information recorded in the ticket 10 in a step A3, and it is judged whether the recorded information of the ticket 10 is normal or not in a step A4.

If the recorded information of the ticket 10 is judged to be normal in the step A4, the ticket 10 is further transported. The pulse motor is deactivated in a certain period of time after the optical sensor 545 detects passage of the ticket 10, and the ticket 10 is made to standby temporarily at the standby portion 517 in a step A5.

During the temporary standby period, the collection processing of the toll displayed portion 1 is carried out by using various processing buttons (not shown), or the ten-key pad 4 in a step A6. For example, when the toll is collected with a highway card, a credit card, an IC card or the like instead by cash, a toll operator inserts such a card received from a road user into the gateway 601 of the card processing unit 600 so as to have card data read, confirms with the display panel 6 that there is nothing abnormal, and operates the operation buttons.

Next, as shown in step A7, the pulse motor of the ticket processing portion 500 rotates reversely, the ticket 10 is transported from the standby portion 517 toward the recording head 516. The recording head 516 records the toll of utilization, the date and hour of utilization, or information related to an exit date and toll collection means, and data is recorded in a card if toll collection is made by a card for the ticket 10 as shown in a step A8 at the time when the ticket 10 in detected by the optical sensor 546. Further, the recorded data are read with the read head 515 in a step A9 so as to judge whether there is something wrong in the recorded information in a step A10.

When it is judged that there is nothing abnormal in the data recorded in the step A10, necessary recorded data are printed at a predetermined location of the ticket 10 by the print head 513 in a step A11. Then, the change-over flapper 542 is swung to the hopper stacker 502 in a step A12, and the ticket 10 is withdrawn into the hopper stacker 502 in a step A13. At this time, the pulse motor is deactivated after confirming passage of the ticket 10 with the optical sensor 547.

When it is judged that there is something abnormal in the record in the ticket 10 in the steps A4 or A10, the ticket 10 is not withdrawn into the hopper stacker 502. The change-over flapper 542 is swung to the gateway 501 side in a step A14, thus returning the ticket 10 to the gateway 501. At this time, the pulse motor is deenergized after confirming passage of the ticket 10 with the optical sensor 548.

If there is a mistake in inserting the ticket 10, it is only required to insert the ticket 10 returned through the gateway 501 correctly again through the gateway 501. If there is an abnormal record, however, processing, such as issuance of a new ticket 10, is performed by means of processing buttons displayed on the display panel 6. Such an operation is performed in case of damage or loss of the ticket 10. Furthermore, the above-described special processing is also performed in case of invalidity of a card.

As described above, in the present invention, the standby portion 517 for holding the ticket 10 in a temporary standby is provided in the ticket processing portion 500. Accordingly, it is not required to give consideration to the order of processing procedures of the ticket 10 and other cards.

Figure 21A:
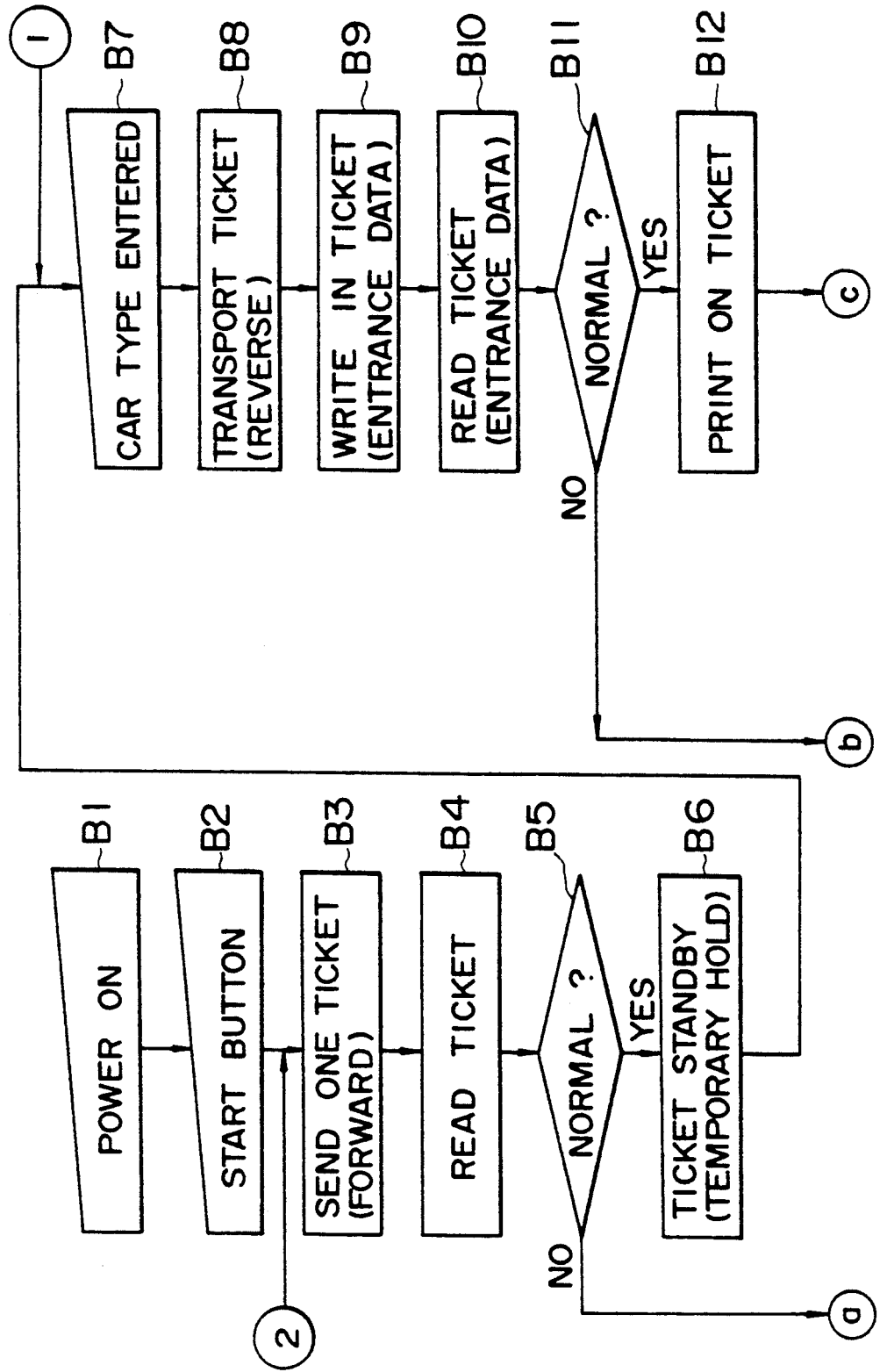

The ticket processing portion 500 has been described as a ticket identifying machine, but the processing flow if the ticket processing portion 500 is adopted as a ticket vending machine is shown in FIGS. 21A and 21B. First, a power supply is turned on as an initial operation in a step B1, and operation buttons for starting operation which appear on the display panel 6 of the operation display portion 1 are pushed in a step B2. In response, as shown in a step B3, the pulse motor rotates forwardly and the delivery roller 506 and the ticket feeding unit 530 are actuated to extract one sheet of ticket 10 out of the hopper stacker 502, and the ticket 10 is sent out to the reproducing head 515 side. When passage of the ticket 10 is detected by the optical sensors 549 and 544, the read head 515 reads the magnetic information in the ticket 10 in a step B4. It is judged whether the ticket 10 is a new ticket or not or whether the inside and outside thereof are correct or not based on the above in a step B5.

When it is judged that the ticket 10 is correct in the step B5, ticket transport is continued. The pulse motor is deenergized after detecting passage of the ticket 10 with the optical sensor 545, and the ticket 10 is made to standby temporarily at the standby portion 517 as shown in a step B6. Such a standby state continues until a pushbutton (not shown) for selecting a car type is operated.

Then, when an operator operates the pushbutton for selecting a car type in a step B7, the pulse motor rotates reversely in a step B9, the ticket 10 starts to move from the standby portion 517 to the read head 516 side. Information such as the car type, the date and hour or an entrance gate and the like is written in the ticket 10 by the read head 516 in a step B9 when passage of the ticket 10 is detected with the optical sensor 546. Then, this recorded information is read by the read head 515 in a step B10, and it is judged whether recording has been performed correctly or not in a step B11.

When it is judged that the record on the ticket 10 is normal in a step B11, necessary information is printed on the ticket 10 by means of the print head 513 in a step B12, and the ticket is sent out to the gateway 50 as represented by step B13. At this time, the pulse motor is deenergized after detecting passage of the ticket 10 with the optical sensor 548.

The ticket 10 which has been sent out to the gate 501 is handed over to a road user by an operator in a step B14. When it is detected by the optical sensor 543 that the ticket 10 has been extracted through the gateway 501, the pulse motor rotates forwardly again, and the delivery roller 506 and the ticket feeding unit 530 are actuated so as to extract ticket sheet out of the hopper stacker 502 and send it to the read head in step B15. Then, passage of the ticket 10 is detected by the optical sensors 549 and 544 and the read head 515 reads magnetic information of the ticket 10 in a step B16. It is judged based on the magnetic information whether the ticket 10 is a new ticket or not or whether inside and outside information thereof are correct or not in a step B17.

When it is judged that the ticket 10 is normal in the step B17, the ticket transport is continued. The pulse motor is deenergized after passage of the ticket 10 is detected by the optical sensor 545, and the ticket 10 is made to stand by temporarily at the standby portion 517 as shown in a step B18, then returned to step B7.

When it is detected that there is something abnormal in the ticket 10 in any of above-described steps B5, B11 and B17, the process is shifted to a step B19 where it is judged an abnormal record. The change-over flapper 542 is changed over to the hopper stacker 502 in a step B20, and the abnormal ticket 10 is withdrawn into the hopper stacker 502 in a step B21. Then, the process returns to the step B3 after the optical sensor 547 detects passage of this abnormal ticket 10.

As described above, it is possible to issue a ticket 10 in a very short period of time after operating a pushbutton for selecting a car type by having a normal ticket 10 standby temporarily at the standby portion 517 in advance.

Incidentally, the processing mode of the ticket processing portion 500 is useful for any entrance gate, an exit gate, a check barrier and a subsequent ticket issuing gate. The selection of these processing modes is achieved by a command to the processing control portion 3 from the operation display portion 1.

Figure 23:
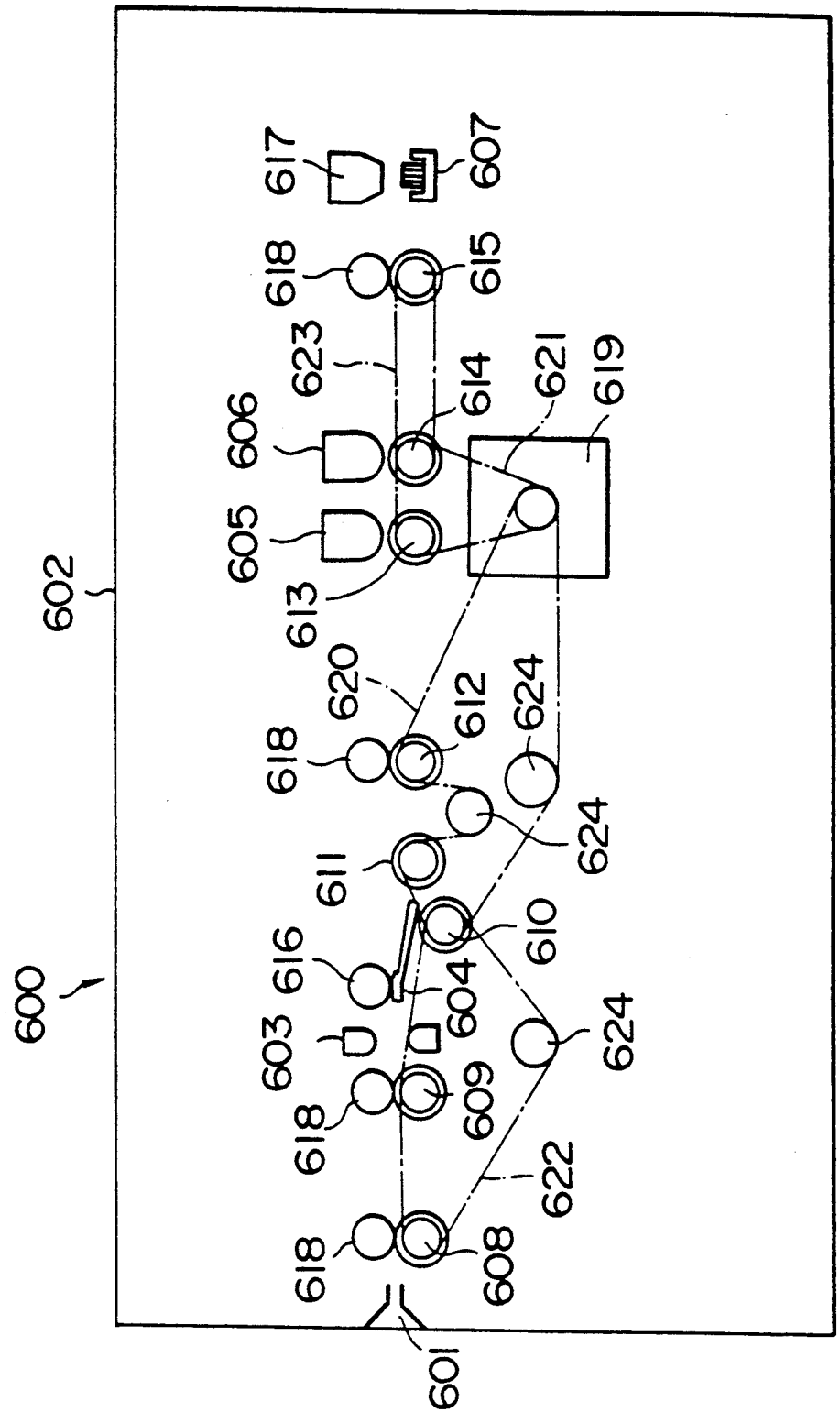

As shown in FIG. 23 which represents a schematic construction of the card processing unit 600, this card processing unit 600 processes various cards such as a "Highway Card" which is a prepaid card other than the ticket 10, a "Separately Paid Plate" which is a credit card, or an IC card.

In the card processing unit 600, a transport line is formed in a straight line from the gateway 610 to the rear end of a cabinet 602. In the cabinet 602, there are provided a card type sensor 603 for detecting a type of the card in consecutive order from the gateway 601 along the transport line, a thermosensitive print head 604 for recording necessary information in a printable card such as a "Highway Card", a reproducing head 605 for reading magnetic information of a magnetic recording portion (not shown) formed in a card such as a credit card, a recording head 606 for writing new magnetic information into this magnetic recording portion, and a read electrode 607 for reading information recorded in a card such as an IC card.

A plurality of driving rollers 608 to 615 which reciprocate a card along the transport line are fitted to the cabinet 602 rotatably at intervals shorter than the length of a card. A presser roller 616 abuts against the thermosensitive print head 607. The driving rollers 613 and 614 oppose the reproducing head 605 and the recording head 606 across the transport line, respectively. On the other hand, a retainer 617 which opposes the read electrode 607 across the transport line is disposed therein. Further, pinch rollers 618 fitted to the cabinet 602 across the transport line, respectively, abut against driving rollers 608 and 609 located between the gateway 601 and the thermosensible print head 604 and driving rollers 612 and 615 located on both sides of the driving rollers 613 and 614 shown in FIG. 19.

Respective driving rollers 608 to 615 are driven to rotate synchronously through timing belts 620 to 622, respectively, by means of a pulse motor 619 which is installed below the reproducing head 605 and the recording head 606 and is able to rotate reciprocably. The actuation of the pulse motor 619, the thermosensible print head 604, the reproducing head 605, the recording head 606, read electrode 607 is controlled by the processing control portion 3 based on the detection signal from the card type sensor 603.

Reference numeral 624 in the figure indicate's a tension roller.

In operation, when an operator inserts a card received from a road user into the gateway 601 at the time of toll collection, the pulse motor 619 rotates forwardly so as to pull the card into the cabinet 602. If the card type sensor 603 detects the card as a "Highway Card", the present balance is read with the reproducing head 605 and output to the processing control portion 3 incorporated in the main body 2. Thereafter, the toll for current toll road use is collected, and the balance and the like are written in the Highway Card with the recording head 606. Then, the pulse motor 619 rotates reversely so as to convey the "Highway Card" to the gateway 601, and on the Way, the above-described processing is confirmed with the reproducing head 605 as occasion demands, and the above-described balance and the like are also printed with thermosensitive print head 604.

When the card type sensor 603 detects that the card is a credit card such as a "Separately Paid Plate", information recorded in the credit card is read with the reproducing head 605 and output to the processing control portion 3. Thereafter, the pulse motor 619 rotates reversely so as to send out the "card" to the gateway 601. Further, in case of an IC card, the IC card is transported up to the read electrode 607 and information recorded therein is read and output to the processing control portion 3. Thereafter, the pulse motor 619 rotates reversely so as to send out the IC card to the gateway 601.

The above description is intended by way of example only and is not intended to limit the present invention in any way except as set forth in the following claims.

We claim:

1. A method of reading information from a toll road ticket comprising the steps of:
   detecting a mark formed on a roll road ticket indicating a magnetic recording density;
   selecting, in accordance with a result of the detecting step, a magnetic record demodulating means for demodulating an output signal of a read head; and
   reading with the read head information recorded magnetically in a magnetic stripe of the ticket.

2. A conversion method of a magnetic record of a toll road ticket, wherein a read head and a write head are used for one track of a magnetic stripe of a ticket, the method comprising the steps of:
   reading information which has been previously recorded on a toll road ticket at a predetermined bit density with the read head;
   recording new information on said toll road ticket thereafter at a bit density higher than that of said previously recorded information with the write head; and reading the recorded contents of the new information with the read head for confirming the recorded contents of the new information.

3. The conversion method according to claim 2, wherein the new information is recorded by a modified frequency modulation system when the previously recorded information has been recorded by a frequency modulation system.

4. A conversion method of a magnetic record of a toll road ticket, wherein a plurality of read heads and a plurality of write heads for a plurality of tracks are used for a magnetic stripe of a ticket, the method comprising the steps of:

reading information which has been previously recorded on a toll road ticket in one track with at least one read head;

recording new information on said toll road ticket over a plurality of tracks by means of a plurality of write heads thereafter; and reading the recorded contents of the new information with a plurality of read heads for confirming the recorded contents of the new information.

5. The conversion method according to claim 4, wherein said new information is recorded in a bit density higher than that of the previously recorded information.

* * * * *